United States Patent
Sugawara et al.

(10) Patent No.: US 7,879,929 B2
(45) Date of Patent: Feb. 1, 2011

(54) QUINOPHTHALONE COMPOUND, MIXED COLORANT, LASER RAY TRANSMITTING COLORED RESIN COMPOSITION, AND LASER-WELDED PRODUCT

(75) Inventors: Shuji Sugawara, Neyagawa (JP); Yoshiteru Hatase, Neyagawa (JP)

(73) Assignee: Orient Chemical Industries Co., Ltd., Osaka (JP)

( * ) Notice: Subject to any disclaimer, the term of this patent is extended or adjusted under 35 U.S.C. 154(b) by 798 days.

(21) Appl. No.: 11/571,916

(22) PCT Filed: Oct. 4, 2005

(86) PCT No.: PCT/JP2005/018895

§ 371 (c)(1), (2), (4) Date: Jan. 10, 2007

(87) PCT Pub. No.: WO2006/038728

PCT Pub. Date: Apr. 13, 2006

(65) Prior Publication Data
US 2007/0254984 A1 Nov. 1, 2007

(30) Foreign Application Priority Data
Oct. 6, 2004 (JP) ............................. 2004-294220

(51) Int. Cl.
C08K 5/08 (2006.01)
C09B 25/00 (2006.01)
B29C 65/16 (2006.01)

(52) U.S. Cl. .................. 524/87; 523/300; 156/272.8; 8/569

(58) Field of Classification Search ............... 524/87; 523/300; 156/277.8, 272.8; 8/569
See application file for complete search history.

(56) References Cited

U.S. PATENT DOCUMENTS

| | | | | |
|---|---|---|---|---|
| 6,916,866 | B2 * | 7/2005 | Joachimi et al. | 524/88 |
| 2005/0137325 | A1 * | 6/2005 | Koshida et al. | 524/601 |
| 2006/0151099 | A1 * | 7/2006 | Yamamoto et al. | 156/272.8 |

FOREIGN PATENT DOCUMENTS

| | | |
|---|---|---|
| DE | 23 34 382 A1 | 1/1975 |
| EP | 1 029 650 | 8/2000 |
| GB | 471 489 | 9/1937 |
| GB | 1 413 754 | 11/1975 |
| JP | 11-170371 | 6/1999 |
| JP | 2000-309694 | 11/2000 |

* cited by examiner

Primary Examiner—Kriellion A Sanders
(74) Attorney, Agent, or Firm—McGlew and Tuttle, P.C.

(57) ABSTRACT

Quinophthalone compound of Formula (1) or (2), mixed colorant, laser ray transmitting colored resin composition containing thereof, and laser-welded product.

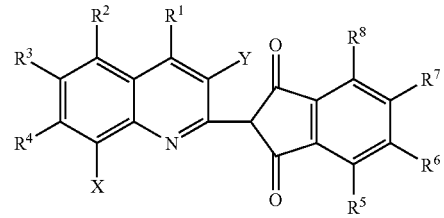

(1)

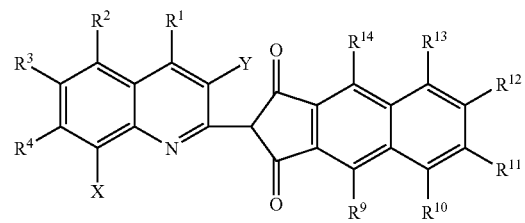

(2)

in each of Formulas (1) and (2),
X: —O-L; L: hydrogen atom, alkyl, aryl;
Y represents hydrogen atom, hydroxyl, mercapto, alkoxy, aryloxy, heterocyclic oxy, acyloxy, alkylsulfonyloxy, arylsulfonyloxy, alkoxycarbonyloxy, aryloxycarbonyloxy, alkylthio, arylthio, heterocyclic thio;
$R^1$ to $R^8$ and $R^1$ to $R^4$ and $R^9$ to $R^{14}$: hydrogen atom, nitro, hydroxyl, mercapto, carboxyl, cyano, thiocyano, halogen atom, alkyl, cycloalkyl, aryl, amino, acyl, alkoxy, aryloxy, heterocyclic oxy, acyloxy, alkylsulfonyloxy, arylsulfonyloxy, alkoxycarbonyloxy, aryloxycarbonyloxy, alkoxycarbonyl, cycloalkyloxycarbonyl, aryloxycarbonyl, heterocyclic oxycarbonyl, carbamoyl, sulfamoyl, alkylsulfonyl, arylsulfonyl, alkylthio, arylthio, heterocyclic thio, alkoxysulfonyl, cycloalkyloxysulfonyl, aryloxysulfonyl, heterocyclic oxysulfonyl;
at least one of $R^5$ to $R^8$ in Formula (1) is carboxyl, at least one of $R^9$ to $R^{14}$ in Formula (2) is carboxyl.

27 Claims, 2 Drawing Sheets

QUINOPHTHALONE COMPOUND, MIXED COLORANT, LASER RAY TRANSMITTING COLORED RESIN COMPOSITION, AND LASER-WELDED PRODUCT

TECHNICAL FIELD

The present invention relates to a yellow quinophthalone compound having heat resistance, solvent resistance, and moisture resistance, a mixed colorant containing the quinophthalone compound, a laser ray transmitting colored resin composition containing the aforementioned quinophthalone compound or mixed colorant, and a laser-welded product wherein a laser ray transmitting member comprising the laser ray transmitting colored resin composition and a laser ray absorbing member have been welded by laser welding.

BACKGROUND ART

Traditionally, dry colors, which are powdery coloring compositions comprising a mixture of a dye or a pigment and a dispersing agent, liquid colors or paste colors, which are coloring compositions comprising a pigment dispersed in a dispersing agent that is liquid at ordinary temperatures, master batches, which are pellet-like, flake-like or bead-like coloring compositions comprising a pigment dispersed in a resin that is solid at ordinary temperatures, and the like, are used to impart colors to thermoplastic synthetic resins. These coloring compositions are used for various purposes making use of the features thereof.

Of these compositions, dry colors comprise a simple mixture of powders of a dye or a pigment and an additive (e.g., metal soaps, waxes, etc.) and are generally inexpensive, but are slightly problematic in terms of dispersibility in synthetic resins, and also problematic in that they are likely to scatter because of the fine powder state during use.

Preferably used for the sake of ease of handling and workplace environmental conservation during use are master batches. Master batches are required to have high dye or pigment concentrations, to minimally affect the various physical properties of thermoplastic resins to be colored, such as heat resistance and mechanical strength, and there have recently been increased demands for better pigment dispersibility and partition quality with the increases in molding precision and speed for thermoplastic resins to be colored.

Furthermore, traditionally, resin parts have been joined together by fastening with fastening parts (bolts, screws, clips, etc.), adhesion using adhesives, vibration welding, ultrasonic welding, and the like. According to laser welding, secure welding is achieved by simple operation to provide strength equivalent to or more than the levels expected by conventional welding, and in addition labor saving, productivity improvements, production cost reductions, etc. can be achieved because vibration and heat have minimal effects. With these features, laser welding is suitable for the joining of functional components, electronic components, etc., for which the avoidance of the influence of vibration and heat is desired in, for example, automobile industry, electric/electronic industry and other fields, and is applicable to the joining of resin parts of complex shapes.

Laser welding of synthetic resin materials can, for example, be conducted as described below. As shown in FIG. 3, one member incorporating a laser ray transmitting material and another member incorporating a laser ray absorbing material are brought into contact with each other. When irradiating laser from the laser ray transmitting material side to the laser ray absorbing material, the laser ray that has penetrated the laser ray transmitting material is absorbed in the laser ray absorbing material and generates heat. By this heat, the laser ray absorbing material is molten around the portion that has absorbed the laser, and the laser ray transmitting material is also molten, the resins of the two members fuse together, and upon cooling sufficient welding strength is obtained and the laser ray transmitting material and the laser ray absorbing material are joined firmly. Features of laser welding include the capability of welding without bringing the laser generation portion in contact with the portion to be welded, the minimal thermal effect on the surrounding portion because the heating is localized, freedom from the problem of mechanical vibration, the capability of welding of fine portions and structures, high reproducibility, maintenance of high air-tightness, high welding strength, inconspicuous welded portion, and no generation of dust etc.

As a technology concerning laser welding, Japanese Patent Laid-Open No. HEI-11-170371 (patent document 1) describes a method of laser welding comprising a step wherein laser ray is irradiated so that it focuses on a portion where an opaque member comprising a laser ray absorbing thermoplastic synthetic resin and a colorless transparent member comprising a laser ray transmitting thermoplastic synthetic resin are in contact with each other. In this case, however, when viewed from the colorless transparent member side, the welded portion differs from the non-welded portion in color and smoothness, posing a problem of poor appearance.

Of such dyes/pigments used to impart colors to molding resins, yellow ones having a structure such as of the azo, anthraquinone, quinophthalone, or metal complex are currently used.

For example, Japanese Patent Laid-Open No. 2000-309694 (patent document 2) discloses a resin composition incorporating a black colorant formulated with Sandoplast Yellow and Sandoplast Violet. However, because the quinophthalone yellow colorant used therein, i.e., C.I. Solvent Yellow 114, is exposed to high temperature for a long time in cases of long resin melting time, such as resin molding using a large molding machine, decomposed dyes/pigments can contaminate not only the resin, but also various portions of the molding machine and other equipment.

Dyes/pigments for coloring resins, especially those for coloring high-melting plastics, pose a considerable problem of color fading due to exposure to high temperature during resin molding. In the above-described method of laser welding as well, colorant heat resistance is an important factor.

If the molded product is exposed to high-temperature high-humidity conditions, dye fastness, such as anti-migration property, is also of concern under the high-temperature high-humidity conditions.

Therefore, there has been a strong demand for a structurally highly stable yellow colorant for coloring recently developed high-melting engineering polymers.

However, with conventional yellow dyes/pigments for coloring resins, it has been very difficult to meet all requirements of fastness, such as heat resistance, moisture resistance, solvent resistance, and anti-sublimation property, while meeting the requirements for brilliant color impartment and uniform compatibility or dispersibility to resins.

Patent document 1: Japanese Patent Laid-Open No. HEI-11-170371

Patent document 2: Japanese Patent Laid-Open No. 2000-309694

DISCLOSURE OF INVENTION

The present invention has been developed in view of the aforementioned problems in the prior art, and is intended to provide a novel compound having a yellow color, and possessing excellent fastness properties such as heat resistance, light fastness, moisture resistance, solvent resistance, anti-migration property, and anti-sublimation property, a mixed colorant containing the compound, a laser ray transmitting colored resin composition containing the aforementioned compound or mixed colorant, and a laser-welded product wherein a laser ray transmitting member comprising the laser ray transmitting colored resin composition and a laser ray absorbing member have been welded by laser welding.

Accomplishing the above object, the quinophthalone compound of the present invention is represented by Formula (1) or (2) below:

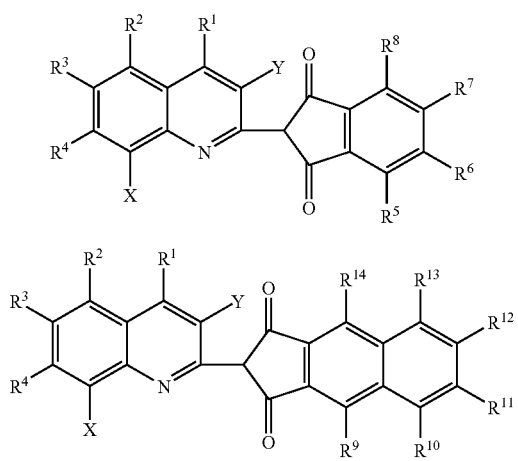

in each of Formulas (1) and (2),

X represents —O-L; L represents a hydrogen atom, a substituted or unsubstituted alkyl group, or a substituted or unsubstituted aryl group;

Y represents a hydrogen atom, a hydroxyl group, a mercapto group, a substituted or unsubstituted alkoxy group, a substituted or unsubstituted aryloxy group, a substituted or unsubstituted heterocyclic oxy group, a substituted or unsubstituted acyloxy group, a substituted or unsubstituted alkylsulfonyloxy group, a substituted or unsubstituted arylsulfonyloxy group, a substituted or unsubstituted alkoxycarbonyloxy group, a substituted or unsubstituted aryloxycarbonyloxy group, a substituted or unsubstituted alkylthio group, a substituted or unsubstituted arylthio group, or a substituted or unsubstituted heterocyclic thio group;

each of $R^1$ to $R^8$ in Formula (1) and $R^1$ to $R^4$ and $R^9$ to $R^{14}$ in Formula (2) independently represents a hydrogen atom, a nitro group, a hydroxyl group, a mercapto group, a carboxyl group, a cyano group, a thiocyano group, a halogen atom, a substituted or unsubstituted alkyl group, a cycloalkyl group, a substituted or unsubstituted aryl group, a substituted or unsubstituted amino group, a substituted or unsubstituted acyl group, a substituted or unsubstituted alkoxy group, a substituted or unsubstituted aryloxy group, a substituted or unsubstituted heterocyclic oxy group, a substituted or unsubstituted acyloxy group, a substituted or unsubstituted alkylsulfonyloxy group, a substituted or unsubstituted arylsulfonyloxy group, a substituted or unsubstituted alkoxycarbonyloxy group, a substituted or unsubstituted aryloxycarbonyloxy group, a substituted or unsubstituted alkoxycarbonyl group, a substituted or unsubstituted cycloalkyloxycarbonyl group, a substituted or unsubstituted aryloxycarbonyl group, a substituted or unsubstituted heterocyclic oxycarbonyl group, a substituted or unsubstituted carbamoyl group, a substituted or unsubstituted sulfamoyl group, a substituted or unsubstituted alkylsulfonyl group, a substituted or unsubstituted arylsulfonyl group, a substituted or unsubstituted alkylthio group, a substituted or unsubstituted arylthio group, a substituted or unsubstituted heterocyclic thio group, a substituted or unsubstituted alkoxysulfonyl group, a cycloalkyloxysulfonyl group, a substituted or unsubstituted aryloxysulfonyl group, or a substituted or unsubstituted heterocyclic oxysulfonyl group; at least one of $R^5$ to $R^8$ in Formula (1) is a carboxyl group, and at least one of $R^9$ to $R^{14}$ in Formula (2) is a carboxyl group.

As the above-described quinophthalone compound, a quinophthalone compound represented by Formula (3) or (4) below is preferable.

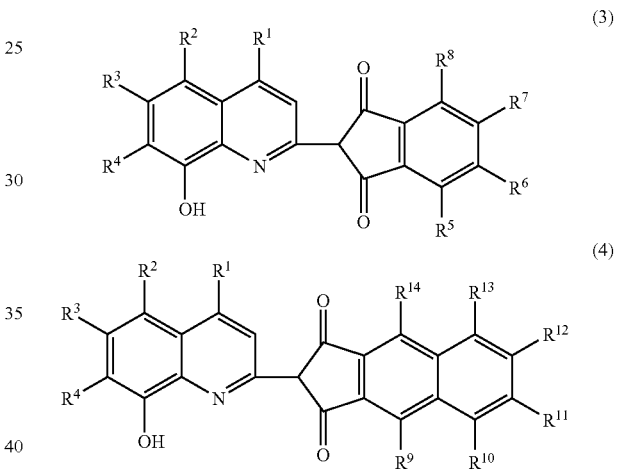

The definitions of $R^1$ to $R^8$ in Formula (3) and $R^1$ to $R^4$ and $R^9$ to $R^{14}$ in Formula (4) are the same as the definitions in Formula (1) or (2), respectively; at least one of $R^5$ to $R^8$ in Formula (3) is a carboxyl group, and at least one of $R^9$ to $R^{14}$ in Formula (4) is a carboxyl group.

The carboxyl group or another acidic group present in a quinophthalone compound represented by Formula (1) to (4) can be in the form of an alkali metal salt, an alkaline earth metal salt, or an ammonium or organic ammonium salt. The carboxyl group as an example acidic group can be in the form of an alkali metal salt such as COOH, COONa, and COOK, an alkaline earth metal salt such as COOCa and COOBa, or an ammonium salt or organic ammonium salt such as $COONH_4$, $COONH_4C_4H_9$, $COONH_4(CH_2)_6NH_3$, and $COONH_2C(NHPh)_2$, wherein Ph represents a phenyl group.

For the above-described quinophthalone compound, it is preferable that no endothermic peak be detected at temperatures of not higher than 550° C., or an endothermic peak exist at a temperature of not lower than 380° C., in thermal analysis. Thereby, the above-described quinophthalone compound can be suitably used for molding high-melting thermoplastic resins.

Also, the mixed colorant of the present invention contains the above-described quinophthalone compound and another coloring ingredient, as a coloring ingredient. Two kinds or more of the quinophthalone compound may be contained, and two kinds or more of the other coloring ingredient may also be contained. As such mixed colorants, black ones are industrially most important, and have many applications making use of the excellent heat resistance of the quinophthalone compound of the present invention.

The aforementioned other coloring ingredient may be one or two or more selected from the group consisting of azo dyes/pigments, azo metal complex dyes/pigments, naphtholazo dyes/pigments, azo lake dyes/pigments, azomethine dyes/pigments, anthraquinone dyes/pigments, quinacridone dyes/pigments, dioxazine dyes/pigments, diketopyrrolopyrrole dyes/pigments, anthrapyridone dyes/pigments, isoindolinone dyes/pigments, indanthrone dyes/pigments, perinone dyes/pigments, perylene dyes/pigments, indigo dyes/pigments, thioindigo dyes/pigments, quinoline dyes/pigments, benzimidazolone dyes/pigments, and triphenylmethane dyes/pigments.

The other coloring ingredient in the aforementioned mixed colorant is preferably one or two or more selected from the group consisting of, near-infrared ray transmitting, azo dyes, triphenylmethane dyes, anthraquinone dyes, perinone dyes, and anthrapyridone dyes. These coloring ingredients may be salt forming dyes prepared by allowing an acid dye to form a salt with an organic amine.

The laser ray transmitting colored resin composition of the present invention contains a thermoplastic resin or a thermoplastic elastomer, and the aforementioned quinophthalone compound of the present invention or the aforementioned mixed colorant of the present invention. The aforementioned thermoplastic resin is preferably a polyamide resin, a polyester resin, or a polyphenylene sulfide resin.

The laser ray transmitting colored resin composition of the present invention well transmits light in the wavelength range from about 800 nm for semiconductor laser to about 1100 nm for YAG laser, i.e., laser ray, has high fastness such as heat resistance and light fastness, has a good anti-migration property, chemical resistance, etc., and exhibits a brilliant color. The laser ray transmitting member incorporating this laser ray transmitting colored resin composition permits laser welding without fading of the color of the resin member in the heat treatment process prior to laser welding, with substantially no pigment sublimation.

The laser-welded product of the present invention is prepared by welding a laser ray transmitting member comprising the aforementioned laser ray transmitting colored resin composition of the present invention, and a laser ray absorbing member comprising a resin composition having a thermoplastic resin or a thermoplastic elastomer, and having a laser ray absorbing layer, by laser welding with laser ray that has passed through the aforementioned laser ray transmitting member.

The laser-welded product of the present invention can be obtained by irradiating laser so that the laser ray penetrates the aforementioned laser ray transmitting member and is absorbed in the aforementioned laser ray absorbing material with the laser ray transmitting member and the laser ray absorbing member in contact with each other, to weld the contact portion of the laser ray transmitting member and the laser ray absorbing member. As such, this laser-welded product has high fastness such as heat resistance and light fastness, has a good anti-migration property, chemical resistance, etc., and exhibits a brilliant color.

The quinophthalone compound in the present invention has a yellow color and is excellent in heat resistance, light fastness, moisture resistance, solvent resistance, anti-migration property, and anti-sublimation property, and offers excellent laser transmission etc. for colored synthetic resins. With these features, the quinophthalone compound and mixed colorant of the present invention can be most appropriately used to coloring high-melting thermoplastic resins, and high-melting thermoplastic resins can be preferably used in the laser ray transmitting colored resin composition of the present invention and the laser ray transmitting colored resin composition in the laser-welded product of the present invention.

BEST MODE FOR CARRYING OUT THE INVENTION

Figure 1:
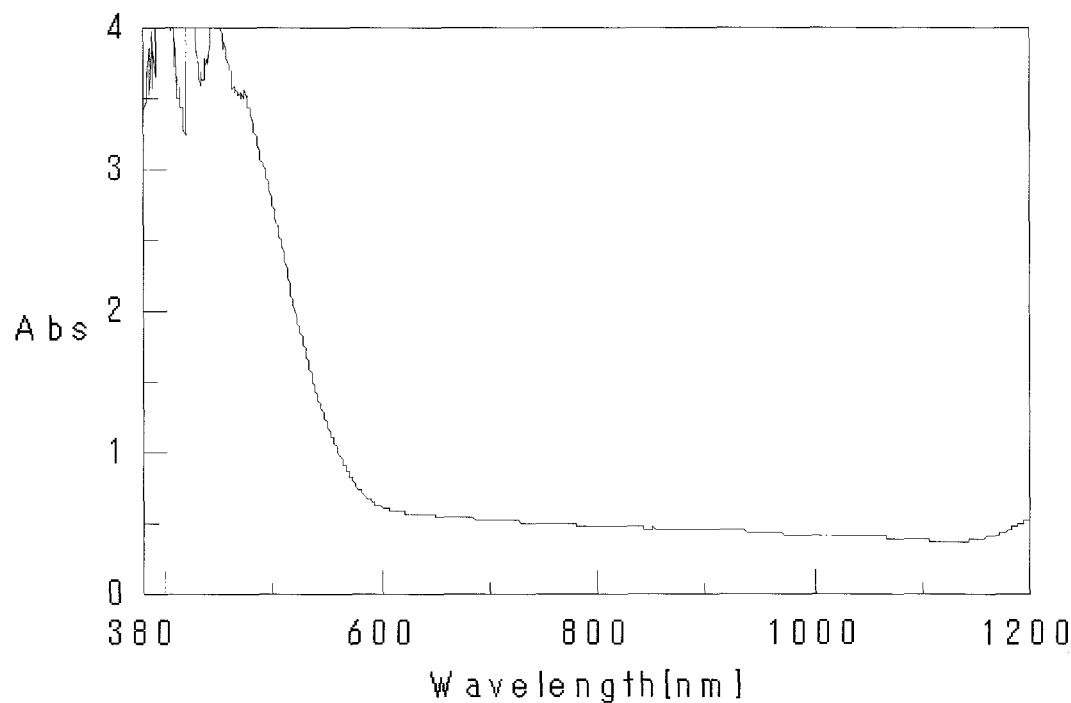
FIG. 1: The absorbance of test piece A-1.

The quinophthalone compound of the present invention, which is represented by Formula (1) or (2) above, can, for example, be prepared as described below.

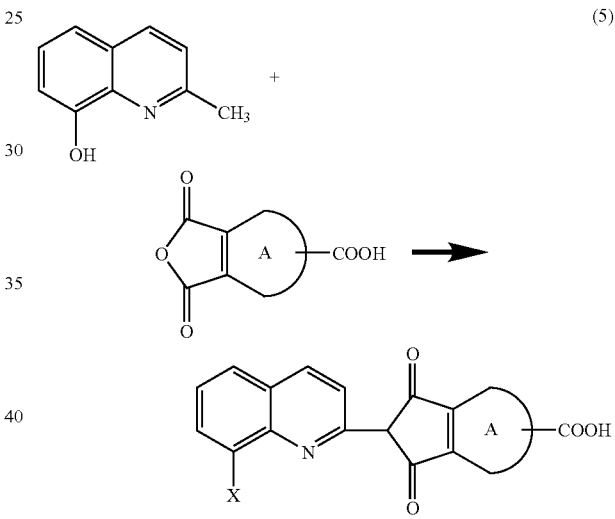

(5)

As shown by this reaction scheme (5), a hydroxyquinaldine derivative and a trimellitic acid anhydride derivative are added to nitrobenzene, and the mixture is heated and stirred at a refluxing temperature for several hours. Subsequently, the product is collected by filtration and washed with methanol, then dried, to yield the quinophthalone compound of the present invention. Here, a process of removing impurity substances such as inorganic salts can be included. The quinophthalone compound and mixed colorant in the present invention preferably have decreased contents of impurity substances such as inorganic salts, whereby the mechanical properties of the thermoplastic resin can be well maintained, and the anti-migration property and anti-sublimation property can be improved. The content of these impurity substances is desirably not more than 2%.

The quinophthalone compound of the present invention can be used as a brilliant yellow dye having excellent fastness such as heat resistance, light fastness, moisture resistance, solvent resistance, anti-migration property, and anti-sublimation property, and exhibits excellent characteristics for a colorant for thermoplastic resins because of good compatibility with resins. The quinophthalone compound of the present invention is also best suited as a yellow colorant for various writing tools and recording inks and as a complementary colorant.

These effects are attributable to the structure of the quinophthalone compound of the present invention. In this regard, Example Compound 1-1 out of the Example Compounds described below to exemplify the quinophthalone compound of the present invention, and Comparative Example Compound 3 and Comparative Example Compound 2, which are commonly used as yellow colorants, out of the Comparative Example Compounds of similar structure described below, are comparatively discussed below.

Example Compound 1-1

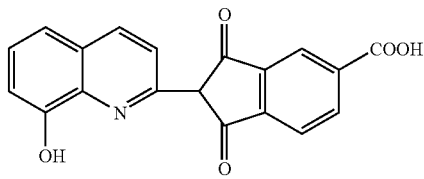

Comparative Example Compound 3

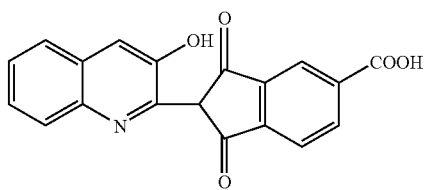

Example Compound 1-1 has a hydroxyl group [—O-L in Formula (1) or (2)] at the substitution position adjacent to the N in the quinoline skeleton thereof, which structurally characterize the quinophthalone compound of the present invention. Hence, Example Compound 1-1 is likely to bind to what is able to have a ligand of Putative Structural Formula (6) below, and is postulated to bind to cations such as metal ions to form a stable structure. This demonstrates the presence of a structure of strong binding force in the molecule thereof, and this compound is considered to exhibit a highly effective binding force for resins. Also, because this compound is highly stable, it is readily extractable as a crystal, permits a convenient manufacturing process, and is industrially advantageous. The present inventors noted the strong binding force between the hydroxyl group [—O-L in Formula (1) or (2)] and N in the quinoline skeleton in the quinophthalone compound of the present invention, and developed the present invention. Note that the —O-L of substituent X in Formula (1) or (2) is preferably a hydroxyl group because of a higher binding force.

Also, Example Compound 1-1 differs from Comparative Example Compound 3 in the location of hydroxyl group. Hence, the quinophthalone compound of the present invention, exemplified by Example Compound 1-1, is highly resistant to heat and excellently stable in resins because the intramolecular cyclic bindability thereof differs from that of compounds like Comparative Example Compound 3.

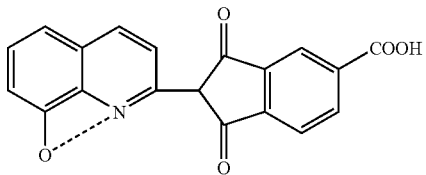

In the structure of Comparative Example Compound 3, the N and hydroxyl group in the quinoline skeleton are distant from each other. Therefore, the hydroxyl group is considered to be capable of binding to the O of the benzophthalone skeleton, as shown by Putative Formula (7), but this bindability is much weaker than the bindability of the hydroxyl group and N in the case of Example Compound 1-1.

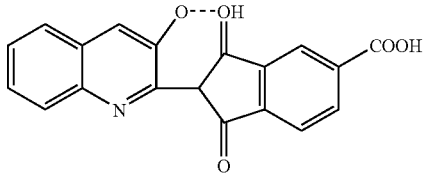

The following findings [1] and [2], which are described in Examples below, demonstrate that the structure of the quinophthalone compound of the present invention exhibit these excellent characteristics.

[1] The results of a thermal analysis of Example Compound 1-1, Comparative Example Compound 3, and Comparative Example Compound 2 are comparatively discussed. Unlike Comparative Example Compound 2, Comparative Example Compound 3 has a carboxy group. Due to this difference, thermal decomposition initiation temperature rose by 36° C., from 319° C. for Comparative Example Compound 2 to 355° C. for Comparative Example Compound 3.

Hence, the presence of a carboxy group is important in increasing heat resistance. The thermal decomposition initiation temperature of Example Compound 1-1 was 402° C., a level higher by 47° C. than that of Comparative Example Compound 3. This indicates that the quinophthalone compound of the present invention has acquired better heat resistance compared to Comparative Example Compound 3, depending on the location of hydroxyl group substitution. In molding high-melting thermoplastic resins, high heat resistance is required; especially when using a large molding machine, it is preferable to use the quinophthalone compound of the present invention as a colorant because of long retention of the molding resin in the molding machine and long duration of high temperature conditions.

Comparative Example Compound 2

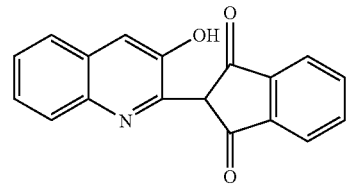

[2] When test piece A-1, which incorporates a resin composition containing Example Compound 1-1, and test piece A-5, which incorporates a resin composition containing a Comparative Example Compound 3, were subjected to a moisture resistance test and a sublimation test concerning the anti-migration property (anti-bleeding quality) of the compound, better results were obtained from Example Compound 1-1 than from Comparative Example Compound 3. The fact of higher resin bindability and better anti-migration property and anti-sublimation property of Example Compound 1-1 than Comparative Example Compound 3 demonstrates a higher retentivity in resins depending on the difference in the location of hydroxyl group.

Each of X and Y in Formula (1) or (2), $R^1$ to $R^8$ in Formula (1), $R^1$ to $R^4$ and $R^9$ to $R^{14}$ in Formula (2), $R^1$ to $R^8$ in Formula (3), and $R^1$ to $R^4$ and $R^9$ to $R^{14}$ in Formula (4), represents a group or atom shown below, respectively.

X represents —O-L;

L represents H, a substituted or unsubstituted alkyl group (e.g., linear or branched alkyl groups having 1 to 18 carbon atoms, such as methyl group, ethyl group, iso-propyl group, n-propyl group, iso-butyl group, n-butyl group, pentyl group, hexyl group, 2-ethylhexyl group, n-octyl group, trifluoromethyl group, and n-decyl group), or a substituted or unsubstituted aryl group (e.g., phenyl group, alkylphenyl group, naphthyl group, etc.).

Y represents a hydrogen atom, a hydroxyl group, a mercapto group, a substituted or unsubstituted alkoxy group (e.g., methoxy group, ethoxy group, iso-propoxy group, n-propoxy group, iso-butoxy group, n-butoxy group, pentyloxy group, hexyloxy group, 2-ethylhexyloxy group, n-octyloxy group, n-decyloxy group, n-dodecyloxy group, 2-hydroxyethoxy group, 2-hydroxypropoxy group, 3-hydroxypropoxy group, 4-hydroxybutoxy group, benzyloxy group, p-chlorobenzyloxy group, 2-phenylethoxy group, 2-methoxyethoxy group, 2-ethoxyethoxy group, 2-(n)propoxyethoxy group, 2-(iso)propoxyethoxy group, 3-methoxypropoxy group, 4-methoxybutoxy group, 3-methoxybutoxy group, 2,3-dimethoxypropoxy group, etc.), a substituted or unsubstituted aryloxy group (e.g., phenoxy, naphthoxy group, etc.), a substituted or unsubstituted heterocyclic oxy group (e.g., pyridyloxy group, quinolyloxy group, furyloxy group, pyranyloxy group, pyrrolyloxy group, imidazolyloxy group, oxazolyloxy group, pyrazolyloxy group, thienyloxy group, thiazolyloxy group, isothiazolyloxy group, isoxazolyloxy group, pyrimidyloxy group, triazinyloxy group, benzothiazolyloxy group, benzoxazolyloxy group, etc.), a substituted or unsubstituted acyloxy group (e.g., those having 1 to 18 carbon atoms, such as acetyloxy group, propionyloxy group, butyryloxy group, octanoyloxy group, benzoyloxy group, p-methylbenzoyloxy group, 1-naphthoyloxy group, and thienoyloxy group, etc.), a substituted or unsubstituted alkylsulfonyloxy group (e.g., those having 1 to 18 carbon atoms, such as methylsulfonyloxy group, ethylsulfonyloxy group, propylsulfonyloxy group, butylsulfonyloxy group, pentylsulfonyloxy group, hexylsulfonyloxy group, 2-ethylhexylsulfonyloxy group, n-octylsulfonyloxy group, n-decylsulfonyloxy group, n-dodecylsulfonyloxy group, and 2-methoxyethoxysulfonyloxy group, etc.), a substituted or unsubstituted arylsulfonyloxy group (e.g., phenylsulfonyloxy group, p-methylphenylsulfonyloxy group, p-methoxyphenylsulfonyloxy group, etc.), a substituted or unsubstituted alkoxycarbonyloxy group (e.g., those having 1 to 20 carbon atoms, such as methoxycarbonyloxy group, ethoxycarbonyloxy group, propoxycarbonyloxy group, butoxycarbonyloxy group, pentyloxycarbonyloxy group, hexyloxycarbonyloxy group, 2-ethylhexyloxycarbonyloxy group, n-octyloxycarbonyloxy group, n-decyloxycarbonyloxy group, n-dodecyloxycarbonyloxy group, and 2-methoxyethoxycarbonyloxy group, etc.), a substituted or unsubstituted aryloxycarbonyloxy group (e.g., phenoxycarbonyloxy group, p-methylphenoxycarbonyloxy group, p-methoxyphenoxycarbonyloxy group, p-chlorophenoxycarbonyloxy group, 1-naphthoxycarbonyloxy group, etc.), a substituted or unsubstituted alkylthio group (e.g., methylthio group, ethylthio group, iso-propylthio group, n-propylthio group, iso-butylthio group, n-butylthio group, pentylthio group, hexylthio group, 2-ethylhexylthio group, n-octylthio group, n-decylthio group, n-dodecylthio group, etc.), a substituted or unsubstituted arylthio group (e.g., phenylthio group, naphthylthio group, etc.), or a substituted or unsubstituted heterocyclic thio group (e.g., pyridylthio group, quinolylthio group, furylthio group, pyranylthio group, pyrrolylthio group, imidazolylthio group, oxazolylthio group, pyrazolylthio group, thienylthio group, thiazolylthio group, isothiazolylthio group, isoxazolylthio group, pyrimidylthio group, triazinylthio group, benzothiazolylthio group, benzoxazolylthio group, etc.).

Each of $R^1$ to $R^{14}$ independently represents a hydrogen atom, a nitro group, a hydroxyl group, a mercapto group, a carboxyl group, a cyano group, a thiocyano group, a halogen atom (e.g., chlorine, bromine, iodine, fluorine, etc.), a substituted or unsubstituted alkyl group (e.g., linear or branched alkyl groups having 1 to 18 carbon atoms, such as methyl group, ethyl group, iso-propyl group, n-propyl group, iso-butyl group, n-butyl group, pentyl group, hexyl group, 2-ethylhexyl group, n-octyl group, and n-decyl group), a cycloalkyl group (e.g., cyclopentyl group, cyclohexyl group, cycloheptyl group, etc.), a substituted or unsubstituted aryl group (e.g., phenyl group, p-chlorophenyl group, m-methylphenyl group, p-methoxyphenyl group, p-cyanophenyl group, p-carboxyphenyl group, p-hydroxyphenyl group, p-mercaptophenyl group, p-(N,N-dimethylamino)phenyl group, p-nitrophenyl group, p-acetylphenyl group, 1-naphthyl group, etc.), a substituted or unsubstituted amino group, a substituted or unsubstituted acyl group (e.g., substituted or unsubstituted acyl groups having 1 to 18 carbon atoms, such as formyl group, acetyl group, propionyl group, butyryl group, octanoyl group, benzoyl group, p-methylbenzoyl group, 1-naphthoyl group, and thienoyl group), a substituted or unsubstituted alkoxy group (e.g., methoxy group, ethoxy group, iso-propoxy group, n-propoxy group, iso-butoxy group, n-butoxy group, pentyloxy group, hexyloxy group, 2-ethylhexyloxy group, n-octyloxy group, n-decyloxy group, n-dodecyloxy group, 2-hydroxyethoxy group, 2-hydroxypropoxy group, 3-hydroxypropoxy group, 4-hydroxybutoxy group, benzyloxy group, p-chlorobenzyloxy group, 2-phenylethoxy group, 2-methoxyethoxy group, 2-ethoxyethoxy group, 2-(n)propoxyethoxy group, 2-(iso)propoxyethoxy group, 3-methoxypropoxy group, 4-methoxybutoxy group, 3-methoxybutoxy group, 2,3-dimethoxypropoxy group, etc.), a cycloalkyloxycarbonyl group (e.g., cyclopentyloxycarbonyl group, cyclohexyloxycarbonyl group, cycloheptyloxycarbonyl group, etc.), a substituted or unsubstituted aryloxy group (e.g., phenoxy, naphthoxy group, etc.), a substituted or unsubstituted heterocyclic oxy group (e.g., pyridyloxy group, quinolyloxy group, furyloxy group, pyranyloxy group, pyrrolyloxy group, imidazolyloxy group, oxazolyloxy group, pyrazolyloxy group, thienyloxy group, thiazolyloxy group, isothiazolyloxy group, isoxazolyloxy group, pyrimidyloxy group, triazinyloxy group, benzothiazolyloxy group, benzoxazolyloxy group, etc.), a substituted or unsubstituted acyloxy group (e.g., substituted or unsubstituted acyloxy groups having 1 to 18 carbon atoms, such as acetyloxy group, propionyloxy group, butyryloxy group, octanoyloxy group, benzoyloxy group, p-methylbenzoyloxy group, 1-naphthoyloxy group, and thienoyloxy group, etc.), a substituted or unsubstituted alkylsulfonyloxy group (e.g., substituted or unsubstituted alkylsulfonyloxy groups having 1 to 18 carbon atoms, such as methylsulfonyloxy group, ethylsulfonyloxy group, propylsulfonyloxy group, butylsulfonyloxy group, pentylsulfonyloxy group, hexylsulfonyloxy group, 2-ethylhexylsulfonyloxy group, n-octylsulfonyloxy group, n-decylsulfonyloxy group, n-dodecylsulfonyloxy group, and 2-methoxyethoxysulfonyloxy group), a substituted or unsubstituted arylsulfonyloxy group (e.g., phenylsulfonyloxy group, p-methylphenylsulfonyloxy group, p-methoxyphenylsulfonyloxy group, etc.), a substituted or unsubstituted alkoxycarbonyloxy group (e.g., substituted or unsubstituted alkoxycarbonyloxy groups having 1 to 20 carbon atoms, such as methoxycarbonyloxy group, ethoxycarbonyloxy group, propoxycarbonyloxy group, butoxycarbonyloxy group, pentyloxycarbonyloxy group, hexyloxycarbonyloxy group, 2-ethylhexyloxycarbonyloxy group, n-octyloxycarbonyloxy group, n-decyloxycarbonyloxy group, n-dodecyloxycarbonyloxy group, and 2-methoxyethoxycarbonyloxy group, etc.), a substituted or unsubstituted aryloxycarbonyloxy group (e.g., phenoxycarbonyloxy group, p-methylphenoxycarbonyloxy group, p-methoxyphenoxycarbonyloxy group, p-chlorophenoxycarbonyloxy group, 1-naphthoxycarbonyloxy group, etc.), a substituted or unsubstituted alkoxycarbonyl group (e.g., methoxycarbonyl group, ethoxycarbonyl group, iso-propoxycarbonyl group, n-propoxycarbonyl group, iso-butoxycarbonyl group, n-butoxycarbonyl group, hexyloxycarbonyl group, 2-ethylhexyloxycarbonyl group, n-octyloxycarbonyl group, n-decyloxycarbonyl group, n-dodecyloxycarbonyl group, 2-hydroxyethoxycarbonyl group, 2-hydroxypropoxycarbonyl group, 3-hydroxypropoxycarbonyl group, 4-hydroxybutoxycarbonyl group, benzyloxycarbonyl group, 2-phenylethoxycarbonyl group, 2-methoxyethoxycarbonyl group, 2-ethoxyethoxycarbonyl group, 2-acetyloxyethoxycarbonyl group, etc.), a substituted or unsubstituted cycloalkyloxycarbonyl group (e.g., cyclopentyloxycarbonyl group, cyclohexyloxycarbonyl group, cycloheptyloxycarbonyl group, etc.), a substituted or unsubstituted aryloxycarbonyl group (e.g., phenoxycarbonyl group, naphthoxycarbonyl group, etc.), a substituted or unsubstituted heterocyclic oxycarbonyl group (e.g., pyridyloxycarbonyl group, quinolyloxycarbonyl group, furyloxycarbonyl group, pyranyloxycarbonyl group, pyrrolyloxycarbonyl group, imidazolyloxycarbonyl group, oxazolyloxycarbonyl group, pyrazolyloxycarbonyl group, thienyloxycarbonyl group, thiazolyloxycarbonyl group, isothiazolyloxycarbonyl group, isoxazolyloxycarbonyl group, pyrimidyloxycarbonyl group, triazinyloxycarbonyl group, benzothiazolyloxycarbonyl group, benzoxazolyloxycarbonyl group, etc.), a substituted or unsubstituted carbamoyl group, a substituted or unsubstituted sulfamoyl group, a substituted or unsubstituted alkylsulfonyl group (e.g., methylsulfonyl group, ethylsulfonyl group, iso-propylsulfonyl group, n-propylsulfonyl group, iso-butylsulfonyl group, n-butylsulfonyl group, pentylsulfonyl group, hexylsulfonyl group, 2-ethylhexylsulfonyl group, n-octylsulfonyl group, n-decylsulfonyl group, n-dodecylsulfonyl group, etc.), a substituted or unsubstituted arylsulfonyl group (e.g., phenylsulfonyl group, p-methylphenylsulfonyl group, p-methoxyphenylsulfonyl group, p-chlorophenylsulfonyl group, 1-naphthylsulfonyl group, etc.), a substituted or unsubstituted alkylthio group (e.g., methylthio group, ethylthio group, iso-propylthio group, n-propylthio group, iso-butylthio group, n-butylthio group, pentylthio group, hexylthio group, 2-ethylhexylthio group, n-octylthio group, n-decylthio group, n-dodecylthio group, etc.), a substituted or unsubstituted arylthio group (e.g., phenylthio group, naphthylthio group, etc.), a substituted or unsubstituted heterocyclic thio group (e.g., pyridylthio group, quinolylthio group, furylthio group, pyranylthio group, pyrrolylthio group, imidazolylthio group, oxazolylthio group, pyrazolylthio group, thienylthio group, thiazolylthio group, isothiazolylthio group, isoxazolylthio group, pyrimidylthio group, triazinylthio group, benzothiazolylthio group, benzoxazolylthio group, etc.), a substituted or unsubstituted alkoxysulfonyl group (e.g., methoxysulfonyl group, ethoxysulfonyl group, iso-propoxysulfonyl group, n-propoxysulfonyl group, iso-butoxysulfonyl group, n-butoxysulfonyl group, pentyloxysulfonyl group, hexyloxysulfonyl group, 2-ethylhexyloxysulfonyl group, n-octyloxysulfonyl group, n-decyloxysulfonyl group, n-dodecyloxysulfonyl group, 2-hydroxyethoxysulfonyl group, 2-hydroxypropoxysulfonyl group, benzyloxysulfonyl group, p-chlorobenzyloxysulfonyl group, 2-methoxyethoxysulfonyl group, 2-ethoxyethoxysulfonyl group, etc.), a cycloalkyloxysulfonyl group (e.g., cyclopentyloxysulfonyl group, cyclohexyloxysulfonyl group, cycloheptyloxysulfonyl group, etc.), a substituted or unsubstituted aryloxysulfonyl group (e.g., phenoxysulfonyl group, naphthoxysulfonyl group, etc.), or a substituted or unsubstituted heterocyclic oxysulfonyl group (e.g., pyridyloxysulfonyl group, quinolyloxysulfonyl group, furyloxysulfonyl group, pyranyloxysulfonyl group, pyrrolyloxysulfonyl group, imidazolyloxysulfonyl group, oxazolyloxysulfonyl group, pyrazolyloxysulfonyl group, thienyloxysulfonyl group, thiazolyloxysulfonyl group, isothiazolyloxysulfonyl group, isoxazolyloxysulfonyl group, pyrimidyloxysulfonyl group, triazinyloxysulfonyl group, benzothiazolyloxysulfonyl group, benzoxazolyloxysulfonyl group, etc.).

Note that at least one of $R^5$ to $R^8$ is a carboxyl group, and at least one of $R^9$ to $R^{14}$ is a carboxyl group.

As examples of the group or atom capable of substituting each of X, Y in Formula (1) or (2), $R^1$ to $R^8$ in Formula (1), $R^1$ to $R^4$ and $R^9$ to $R^{14}$ in Formula (2), $R^1$ to $R^8$ in Formula (3), and $R^1$ to $R^4$ and $R^9$ to $R^{14}$ in Formula (4), there may be mentioned a hydroxyl group, a carboxyl group, a nitro group, an amino group, a halogen atom (e.g., fluorine atom, chlorine atom, bromine atom, iodine atom, etc.), a linear or branched substituted (e.g., by a hydroxyl group, a halogen atom, an alkoxy group having 1 to 18 carbon atoms, etc.) or unsubstituted alkyl group having 1 to 18 carbon atoms (e.g., methyl group, ethyl group, iso-propyl group, n-propyl group, iso-butyl group, n-butyl group, pentyl group, hexyl group, 2-ethylhexyl group, n-octyl group, n-decyl group, etc.), a substituted (e.g., by a hydroxyl group, a halogen atom, an alkyl group having 1 to 18 carbon atoms, an alkoxy group having 1 to 18 carbon atoms, etc.) or unsubstituted aryl group (e.g., phenyl group, p-chlorophenyl group, m-methylphenyl group, p-methoxyphenyl group, p-cyanophenyl group, p-carboxyphenyl group, p-hydroxyphenyl group, p-mercaptophenyl group, p-(N,N-dimethylamino)phenyl group, p-nitrophenyl group, p-acetylphenyl group, 1-naphthyl group, etc.), a linear or branched substituted (e.g., by a hydroxyl group, a halogen atom [fluorine, chlorine, bromine, iodine, etc.], an alkyl group having 1 to 18 carbon atoms, an alkoxy group having 1 to 18 carbon atoms, etc.) or unsubstituted alkoxy group having 1 to 18 carbon atoms (e.g., methoxy group, ethoxy group, iso-propoxy group, n-propoxy group, iso-butoxy group, n-butoxy group, pentyloxy group, hexyloxy group, 2-ethylhexyloxy group, n-octyloxy group, n-decyloxy group, n-dodecyloxy group, etc.), a cycloalkyl group having 3 to 12 carbon atoms (e.g., cyclopentyl group, cyclohexyl group, cycloheptyl group, etc.), an acyl group having 1 to 18 carbon atoms (e.g., formyl group, acetyl group, propionyl group, butyryl group, octanoyl group, benzoyl group, p-methylbenzoyl group, 1-naphthoyl group, thienoyl group, etc.) and the like.

For the quinophthalone compound of the present invention, it is particularly preferable that X in Formula (1) or (2) be a hydroxyl group, and $R^2$ or $R^{12}$ be a carboxyl group.

As specific examples of the quinophthalone compound represented by Formula (1) or (3) above, there may be mentioned the following Example Compounds 1-1 to 1-10 wherein X, Y, and $R^1$ to $R^8$ in Formula (1) below are specified. However, the present invention is not limited to these examples.

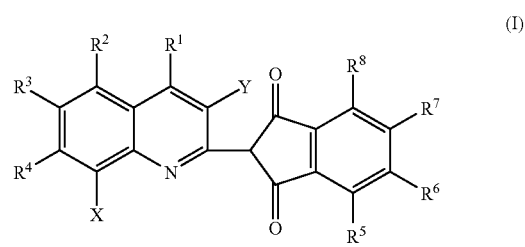

(I)

TABLE 1

| Example Compound | X | Y | $R^1$~$R^4$ | $R^5$~$R^6$ |
|---|---|---|---|---|
| 1-1 | OH | H | $R^1$=$R^2$=$R^3R^4$=H | $R^5$=$R^6$=$R^8$=H, $R^7$=COOH |
| 1-2 | OH | H | $R^1$=$R^2$=$R^3R^4$=H | $R^5$=$R^6$=H, $R^6$=CONHC$_3$H$_6$OCH$_3$, $R^7$=COOH |
| 1-3 | OH | H | $R^1$=$R^2$=$R^3R^4$=H | $R^5$=$R^6$=H, $R^6$=$R^7$=COOH |
| 1-4 | OAc | H | $R^1$=$R^2$=$R^3R^4$=H | $R^5$=$R^8$=H, $R^6$=$R^7$=COOH |
| 1-5 | OH | H | $R^1$=$R^2$=$R^3R^4$=H | $R^5$=$R^6$=H, $R^6$=CONHC$_6$H$_4$COOH, $R^7$=COOH |
| 1-6 | OMe | H | $R^1$=$R^2$=$R^3R^4$=H | $R^5$=$R^8$=H, $R^6$=CONHC$_2$H$_4$OH, $R^7$=COOH |
| 1-7 | OH | H | $R^1$=Cl, $R^2$=$R^3$=$R^4$=H | $R^5$=$R^8$=H, $R^6$=COOC$_{10}$H$_8$COOH, $R^7$=COOH |
| 1-8 | OH | H | $R^1$=Ph, $R^2$=$R^3$=$R^4$=H | $R^5$=$R^8$=H, $R^6$=$R^6R^7$=COOH |
| 1-9 | OH | H | $R^1$=$R^2$=$R^3R^4$=H | $R^5$=$R^8$=H, $R^6$=$R^7$=COO(Ca)$_{1/2}$ |
| 1-10 | OAc | H | $R^1$=$R^2$=$R^3R^4$=H | $R^5$=$R^6$=$R^8$=COOH, $R^7$=SO$_2$NHC$_6$H$_4$COOH |
| 1-11 | OH | H | $R^1$=$R^2$=$R^3R^4$=H | $R^5$=$R^6$=$R^8$=H, $R^7$=COO(Ca)$_{1/2}$ |
| 1-12 | OH | H | $R^1$=$R^2$=$R^3R^4$=H | $R^5$=$R^6$=$R^8$=H, $R^7$=COONH$_4$ |
| 1-13 | OH | H | $R^1$=$R^2$=$R^3R^4$=H | $R^5$=$R^8$=H, $R^6$=$R^7$=COONa |
| 1-14 | OH | H | $R^1$=$R^2$=$R^3R^4$=H | $R^5$=$R^7$=$R^8$=H, $R^6$=COONa |
| 1-15 | OH | OMe | $R^1$=$R^2$=$R^3R^4$=H | $R^5$=$R^6$=$R^8$=H, $R^7$=COOH |

Note that in Table 1, OMe represents OCH$_3$ and OAc represents OCOCH$_3$.

Particularly preferred are the following Example Compounds 1-1 to 1-3.

Example Compound 1-1

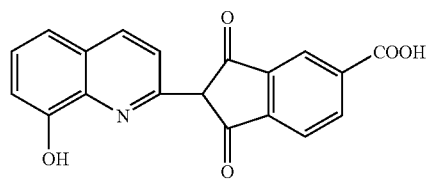

Example Compound 1-2

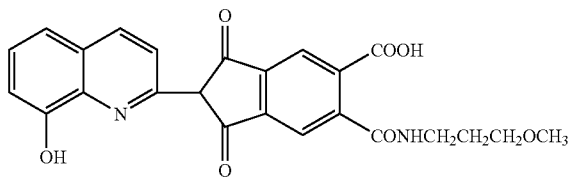

Example Compound 1-3

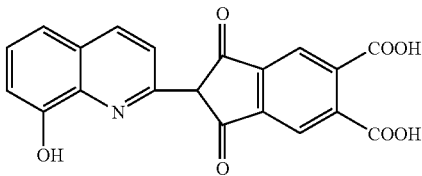

As specific examples of the quinophthalone compound represented by Formula (2) or (4) above, there may be mentioned the following Example Compounds 2-1 to 2-10 wherein X, Y, $R^1$ to $R^4$, and $R^9$ to $R^{14}$ in Formula (II) below are specified. However, the present invention is not limited to these examples.

(II)

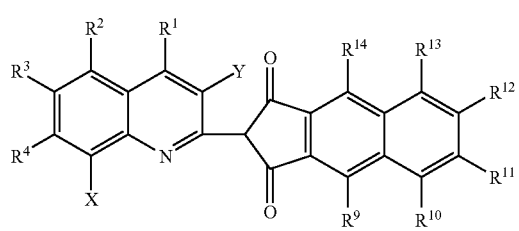

TABLE 2

| Example Compound | X | Y | $R^1$~$R^4$ | $R^9$~$R^{14}$ |
|---|---|---|---|---|
| 2-1 | OH | H | $R^1=R^2=R^3R^4=H$ | $R^9=R^{10}=R^{11}=R^{13}=R^{14}=H$, $R^{12}=COOH$ |
| 2-2 | $OC_8H_4COOH$ | H | $R^1=R^2=R^3R^4=H$ | $R^9=R^{10}=R^{11}=R^{13}=R^{14}=H$, $R^{12}=COOH$ |
| 2-3 | OAc | H | $R^1=R^2=R^3R^4=H$ | $R^9=R^{10}=R^{13}=R^{14}=H$, $R^{12}=COOH$ |
| 2-4 | OH | H | $R^1=R^2=R^3R^4=H$ | $R^9=R^{10}=R^{13}=R^{14}=H$, $R^{11}=R^{12}=COOH$ |
| 2-5 | OH | H | $R^1=COOH$, $R^2=R^3=R^4=H$ | $R^9=R^{10}=R^{11}=R^{13}=R^{14}=H$, $R^{12}=COOH$ |
| 2-6 | OH | H | $R^1=R^2=R^3=R^4=H$ | $R^9=R^{11}=R^{12}=R^{14}=H$, $R^{10}=R^{13}=COONa$ |
| 2-7 | OH | H | $R^1=Cl$, $R^2=R^3=R^4=H$ | $R^9=R^{10}=R^{11}=R^{13}=R^{14}=H$, $R^{12}=COOH$ |
| 2-8 | OH | OMe | $R^1=R^2=R^3=R^4=H$ | $R^9=R^{10}=R^{11}=R^{13}=R^{14}=H$, $R^{12}=COOH$ |
| 2-9 | OH | H | $R^1=R^2=R^3=R^4=H$ | $R^9=R^{10}=R^{11}=R^{13}=R^{14}=H$, $R^{12}=COO(Ca)_{1/2}$ |
| 2-10 | OH | H | $R^1=R^2=R^3=R^4=H$ | $R^9=R^{10}=R^{11}=R^{13}=R^{14}=H$, $R^{12}=COO(Ba)_{1/2}$ |

Note that in Table 2, OMe represents $OCH_3$ and OAc represents $OCOCH_3$.

Note that in Table 2, OMe represents $OCH_3$ and OAc represents $OCOCH_3$.

Particularly preferred is the following Example Compound 2-1.

Example Compound 2-1

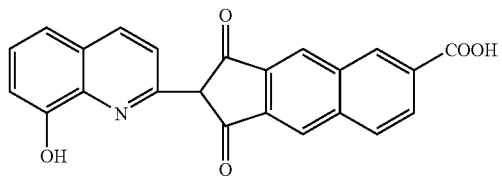

The mixed colorant of the present invention contains one or 2 species or more of a quinophthalone compound represented by any one of Formulas (1) to (4) above as a coloring ingredient, and another coloring ingredient.

Because the quinophthalone compound in the present invention can impart a yellow color, it is possible to obtain mixed colorants of various colors, for example, orange (yellow+red), green (e.g., yellow+blue), and black (e.g., blue+yellow+red, or purple+yellow), when the compound is combined with colorants of other colors. In particular, the use as a black colorant is industrially important.

As preferable examples of other coloring ingredients that may be formulated, there may be mentioned one or two or more organic dyes/pigments selected from the group consisting of azo dyes/pigments, azo metal complex dyes/pigments, naphtholazo dyes/pigments, azo lake dyes/pigments, azomethine dyes/pigments, anthraquinone dyes/pigments, quinacridone dyes/pigments, dioxazine dyes/pigments, diketopyrrolopyrrole dyes/pigments, anthrapyridone dyes/pigments, isoindolinone dyes/pigments, indanthrone dyes/pigments, perinone dyes/pigments, perylene dyes/pigments, indigo dyes/pigments, thioindigo dyes/pigments, quinoline dyes/pigments, benzimidazolone dyes/pigments, and triphenylmethane dyes/pigments. Colors of these colorants include yellow, red, blue, green, black, and the like.

The mixed colorant of the present invention may incorporate one or two or more selected from the group consisting of, near-infrared ray transmitting, azo dyes, triphenylmethane dyes, anthraquinone dyes, perinone dyes, and anthrapyridone dyes as the aforementioned other coloring ingredient. In this case, the mixed colorant is suitable for use as a colorant for near-infrared ray transmitting filters and optical disk transmission sides.

Also, the mixed colorant of the present invention may have the aforementioned other coloring ingredient to be a salt forming dye prepared by allowing an acid dye to form a salt with an organic amine. Such a salt forming dye can be obtained from a combination of an anionic ingredient from an acid dye and a cationic ingredient from an organic amine. Hence, the salt forming dye can be obtained by a salt forming reaction of an anion from an acid dye and an organic amine (e.g., a cation obtained from primary amine, secondary amine, tertiary amine, guanidine, or rosin amine, etc.). This salt forming reaction can employ a heretofore known ionic reaction. For example, an acid dye ingredient having two sulfonic groups is dispersed in water, a solution of an organic amine ingredient at 1.5 to 2.5 mols per mol of the dye in aqueous hydrochloric acid is added drop by drop to the aforementioned dispersion liquid, and the dispersion liquid is stirred for several hours to cause the reaction. The reaction mixture is filtered, the cake filtered out is washed with water and dried, to yield a salt forming dye.

The salt forming dye thus obtained is well compatible with thermoplastic resins, is unlike to undergo color fading in the molding process, and offers high anti-bleeding quality for colored molded products. This is probably because the salt forming dye has an anchor effect in the thermoplastic resin composition and, along with the quinophthalone compound of the present invention, suitably suppresses the bleeding phenomenon.

As the above-described cationic ingredient from an organic amine, there may be mentioned, for example, heretofore known aromatic amines, aliphatic amines, and the like. As specific examples of the organic amine, there may be mentioned aliphatic amines such as butylamine, hexylamine, pentylamine, octylamine, laurylamine, myristylamine, palmitylamine, cetylamine, oleylamine, stearylamine, dibutylamine, 2-ethylhexylamine, di-(2-ethylhexyl)amine, and dodecylamine; alicyclic amines such as cyclohexylamine, di-cyclohexylamine, and rosin amine; alkoxyalkylamines such as 3-propoxypropylamine, 2-ethylhexylamine, di-(3-ethoxypropyl)amine, 3-butoxypropylamine, octoxypropylamine, and 3-(2-ethylhexyloxy)propylamine; alkanol-group-containing amines such as N-cyclohexylethanolamine and N-dodecylimino-di-ethanol; diamines like dimethylaminopropylamine and dibutylaminopropylamine; amines of guanidine derivatives such as 1,3-diphenylguanidine, 1-o-tolylguanidine, and di-o-tolylguanidine; and aromatic amines such as aniline, benzylamine, naphthylamine, phenylamine, phenylenediamine, methylphenylenediamine, and xylenediamine (or N-monoalkyl substituted), and the like. Of these organic amines, alicyclic amines and guanidine derivatives can be mentioned as preferable examples.

As examples of the acid dye from which the above-described anionic ingredient is obtained, there may be mentioned the following acid dyes.

Red acid dyes include monoazo acid dyes such as C.I. Acid Red 1, 2, 3, 4, 5, 6, 7, 8, 9, 10, 11, 12, 13, 14, 15, 16, 17, 18, 19, 20, 21, 22, 23, 24, 25, 25:1, 26, 26:1, 26:2, 27, 29, 30, 31, 32, 33, 34, 35, 36, 37, 39, 40, 41, 42, 43, 44, 45, 49, 53, 54, 55, 57, 59, 60, 62, 64, 68, 74, 76, 76:1, 88, 102, 106, 107, 108, 110, 113, 120, 127, 131, 132, 133, 134, 135, 137, 138, 141, 155, 157, 160, 161, 172, 175, 176, 177, 181, 231, 237, 239, 240, 242, 249, 252, 253, 257, 263, 264, 267, 274, 276, 280, 283, 309, 311, 324, 325, 326, 334, 335, 336, 337, 340, 343, 344, 347, 348, 353, and 354;

disazo acid dyes such as C.I. Acid Red 47, 56, 65, 66, 67, 70, 71, 73, 85, 86, 89, 97, 99, 104, 111, 112, 114, 115, 116, 123, 125, 128, 142, 144, 148, 150, 151, 152, 154, 158, 163, 164, 167, 170, 171, 173, 241, 255, 260, 286, 299, 323, 333, 350, and 351; and anthraquinone acid dyes (including anthrapyridone acid dyes) such as C.I. Acid Red 80, 81, 82, 83, and 356.

Purple acid dyes include anthraquinone acid dyes (including anthrapyridone acid dyes) such as C.I. Acid Violet 29, 31, 33, 34, 36, 36:1, 39, 41, 42, 43, 47, 51, 63, 76, 103, 118, and 126; and triphenylmethane acid dyes such as C.I. Acid Violet 15, 16, 17, 19, 21, 23, 24, 25, 38, 49, and 72.

Blue acid dyes include anthraquinone acid dyes such as C.I. Acid Blue 2, 8, 14, 25, 27, 35, 37, 40, 41, 41:1, 41:2, 43, 45, 46, 47, 49, 50, 51, 51, 53, 54, 55, 56, 57, 58, 62, 62:1, 63, 64, 65, 68, 69, 70, 78, 79, 80, 81, 96, 111, 124, 127, 127:1, 129, 137, 138, 143, 145, 150, 175, 176, 183, 198, 203, 204, 205, 208, 215, 220, 221, 225, 226, 227, 230, 231, 232, 233, 235, 239, 245, 247, 253, 257, 258, 260, 261, 264, 266, 270, 271, 272, 273, 274, 277, 277:1, 278, 280, 281, 282, 286, 287, 288, 289, 290, 291, 292, 293, 294, 295, 298, 301, 302, 304, 305, 306, 307, 313, 316, 318, 322, 324, 327, 331, 333, 336, 339, 340, 343, 344, and 350; and triphenylmethane acid dyes such as C.I. Acid Blue 1, 3, 5, 7, 9, 11, 13, 15, 17, 22, 24, 26, 34, 48, 75, 83, 84, 86, 88, 90, 90:1, 91, 93, 99, 100, 103, 104, 108, 109, 110, 119, 123, 147, 206, 213, and 269.

Green acid dyes include anthraquinone acid dyes such as C.I. Acid Green 10, 17, 25, 25:1, 27, 36, 37, 38, 40, 41, 42, 44, 54, 59, 69, 71, 81, 84, 95, 101, 110, and 117; and triphenylmethane acid dyes such as C.I. Acid Green 3, 5, 6, 7, 8, 9, 11, 13, 14, 15, 16, 18, 22, 50, and 50:1.

As specific examples of other useful dyes, there may be mentioned orange perinone dyes such as C.I. Solvent Orange 60 and 78 and C.I. Vat Orange 15;

red perinone dyes such as C.I. Solvent Red 135, 162, 178, and 179, and C.I. Vat Red 7; and purple perinone dyes such as C.I. Solvent Violet 29.

The mixed colorant of the present invention is obtained by blending raw materials by an optionally chosen method of blending. It is generally preferable that the blending ingredients be homogenized to the maximum possible extent. Specifically, for example, all raw materials are blended and homogenized in a mechanical mixer such as a blender, kneader, Banbury mixer, roll mixer or extruder to yield a mixed colorant. The mixed colorant can also be obtained as a high-concentration colored resin composition. For the high-concentration colored resin composition, previously dry-blended raw materials may be kneaded and homogenized in a molten state in a heated extruder, then extruded into a needle, which needle is then cut into desired length to yield a colored granular resin composition (colored pellets).

The quinophthalone compound and mixed colorant of the present invention can be used after granulation treatment or particle-forming treatment. Granulation or particle formation prevents colorant scattering and facilitates handling, and also improves resin dispersibility. Available methods of granulation include mechanical granulation using a granulating machine, and solidification by spraying a solution or dispersion using a spray drier. Also, various additives and granulating agents can be used. As examples of the aforementioned granulating agent, there may be mentioned anionic surfactants, nonionic surfactants, cationic surfactants, water-soluble high-molecular compounds and the like. When spray drying granulation, for example, is used, a mechanical mill such as a colloid mill, sand mill or ball mill may be used as necessary in previously uniformly blending at least a quinophthalone compound or a mixed colorant, a granulating agent, and a solvent, using the Disper Mixer, the Homomixer, or the like.

As examples of the above-described surfactant, there may be mentioned anionic surfactants such as fatty acids and salts thereof, alkylbenzenesulfonates, alkylnaphthalenesulfonates, alkylsulfates, polyoxyethylenealkyl ether sulfates, alkylphosphates, polyoxyethylenealkyl ether phosphates, and naphthalenesulfonate formalin condensation products; nonionic surfactants such as polyoxyethylenealkyl ethers, polyoxyethylenealkylphenyl ethers, polyoxyethylenepolyoxypropyleneglycol, and polyoxyethylene sorbitan fatty acid partial esters; and cationic surfactants such as aliphatic amines, quaternary ammonium salts, and alkylpyridinium salts.

As examples of the above-described water-soluble high-molecular compound, there may be mentioned methyl cellulose, hydroxyethyl cellulose, hydroxypropylmethyl cellulose, carboxylmethyl cellulose, modified starch, gum arabic, algin, cyclodextrin, pullulan, casein, gelatin, lignin, polyvinyl alcohol, polyethylene oxide, polyacrylates, styrene-maleic anhydride copolymer, olefin-maleic anhydride copolymer, polyvinylpyrrolidone, polyethyleneglycol, polyester, polyamide, polyurethane, and the like.

The quinophthalone compound (colorant) and mixed colorant of the present invention can serve as good colorants for master batches (high-concentration colored resin compositions). Also, it is preferable that a black mixed colorant containing a quinophthalone compound and another coloring ingredient be prepared as a master batch. This is because the quinophthalone compound of the present invention is unlikely to undergo decomposition and sublimation due to high temperatures and hence unlikely to discolor when manufacturing a master batch containing the quinophthalone compound of the present invention by extrusion treatment and the like. As such, a master batch can be obtained by, for example, blending a powder or pellets of master batch base thermoplastic resin, the quinophthalone compound or mixed colorant of the present invention, and, if necessary, other ingredients, in a tumbler, Super-mixer, or the like, and pelletizing or coarsely granulating the blend by the thermal melting method using an extruder, batch-wise kneader, roll kneader, or the like. It is also possible to obtain a master batch by, for example, adding the aforementioned quinophthalone compound or mixed colorant of the present invention and, if necessary, other ingredients, to a thermoplastic resin while remaining in solution after synthesis, and then removing the solvent (a colored resin composition for molding at an ordinary concentration can also be obtained by the same procedures).

By using the thus-obtained colored pellets or coarse particles (colorant in the form of a master batch) to impart a color to a thermoplastic resin, and performing molding treatment by a conventional method, a uniformly colored resin molded product is obtained.

In the case of a master batch, the aforementioned colorant may be contained at 1 to 30% by weight relative to thermoplastic resin. Preferably, the colorant content is 5 to 15% by weight.

Production of a resin molded product colored with the quinophthalone compound (colorant) or mixed colorant of the present invention can be achieved by various procedures in common use. For example, it can be achieved by molding using a colored resin composition (pellets or the like) in a processing machine such as an extruder, injection molding machine or roll mill, and can also be achieved by blending transparent resin pellets or powder, a milled colorant (quinophthalone compound or mixed colorant), and, if necessary, various additives, in an appropriate mixer, and molding this blend using a processing machine. For example, it is also possible to add a colorant to a monomer containing an appropriate polymerization catalyst, to polymerize the resulting mixture to yield the desired resin, and to mold the resin by an appropriate method. Any commonly used method of molding can be adopted, e.g., injection molding, extrusion molding, compression molding, foaming molding, blow molding, vacuum molding, injection blow molding, rotation molding, calender molding, solution casting, and the like. The colorant concentration in the resin molded product is preferably 0.01 to 5% by weight, more preferably 0.1 to 1% by weight, relative to the thermoplastic resin.

As examples of the thermoplastic resin (including thermoplastic resins used in the laser ray transmitting colored resin composition or master batch of the present invention) to be colored with the quinophthalone compound (colorant) or mixed colorant of the present invention, there may be mentioned polyamide resins (e.g., nylon 6, nylon 66, nylon 46, nylon 11, nylon 12, nylon 69, nylon 610, nylon 612, nylon 96, non-crystalline nylon, high-melting nylon, nylon RIM, nylon MIX6, etc.), polyolefin resins (e.g., polyethylene resins such as high-density polyethylene, medium-density polyethylene, low-density polyethylene, linear low-density polyethylene, ethylene-vinyl acetate copolymer, and ethylene-ethyl acrylate copolymer; polypropylene resins such as propylene homopolymer, propylene-ethylene block copolymer or random copolymer, and propylene-ethylene-butene-1 copolymer; polybutene-1, poly-4-methylpentene-1, etc.), polystyrene resin, polymethylpentene resin, methacrylic resin, acrylic polyamide resin, EVOH (ethylenevinyl alcohol) resin, polycarbonate resin, polyester resins such as polyethylene terephthalate (PET) and polybutylene terephthalate (PBT) (e.g., polyethylene terephthalate resin obtained by a polymerization condensation reaction of terephthalic acid and ethylene glycol, polybutylene terephthalate resin obtained by a polymerization condensation reaction of terephthalic acid and butylene glycol, etc.), polyacetal resin, polyvinyl chloride resin, polyvinylidene chloride resin, polyphenylene oxide resin, polyphenylene sulfide resin, polyarylate resin, polyallylsulfone resin, fluorine resin, non-crystalline (transparent) nylon, liquid crystal polymer, and the like. Of these, polyamide resin (nylon), polyester resin, and phenylene sulfide are preferable.

Also, it is possible to use copolymer resins of two kinds or three kinds or more of the aforementioned thermoplastic resin, for example, AS (acrylonitrile-styrene) copolymer resin, ABS (acrylonitrile-butadiene-styrene) copolymer resin, AES (acrylonitrile-EPDM-styrene) copolymer resin, PA-PBT copolymer resin, PET-PBT copolymer resin, PC-PBT copolymer resin, PC-PA copolymer resin, and the like.

As examples of other thermoplastic resins, there may be mentioned thermoplastic elastomers such as polystyrene thermoplastic elastomers, polyolefin thermoplastic elastomers, polyurethane thermoplastic elastomers, and polyester thermoplastic elastomers; synthetic waxes based on the above-described resins or natural waxes, and the like. These thermoplastic resins are not subject to limitation as to molecular weight.

The aforementioned colored resin composition (including the aforementioned laser ray transmitting colored resin composition and the aforementioned master batch) may also be formulated with various additives as necessary. Such additives include, for example, auxochromic agents, dispersing agents, fillers, stabilizers, plasticizers, modifiers, ultraviolet absorbents or light stabilizers, antioxidants, antistatic agents, lubricants, mold-releasing agents, crystallization promoters, crystal nucleating agents, flame retardants, elastomers for improving impact resistance, and the like.

The aforementioned resin composition may contain appropriate amounts of various reinforcing materials or fillers according to the intended use and purpose thereof. Such reinforcing materials or fillers may be any ones usable for ordinary synthetic resins, and may be in the any form such as fibrous, tabular, powdery, particulate, and the like.

As reinforcing fibrous materials, there may be used, for example, glass fiber, carbon fiber, other inorganic fibers, and organic fibers (aramid, polyphenylene sulfide, nylon, polyester, liquid crystal polymer, etc.), fibrous potassium titanate whiskers, barium titanate whiskers, aluminum borate whiskers, silicon nitride whiskers, and the like. In view of laser transmission, glass fiber is preferable for resin reinforcement. The fiber length of glass fiber is preferably 2 to 15 mm and the fiber diameter is preferably 1 to 20 μm. The form of glass fiber is not subject to limitation, and may be of any one, e.g., roving, milled fiber, and the like. These glass fibers may be used singly or in combination of two kinds or more. Their content is preferably 5 to 120% by weight relative to 100% by weight of thermoplastic resin. If the content is less than 5% by weight, a sufficient glass fiber-reinforcing effect is unlikely to be attained; if the content exceeds 120% by weight, moldability is likely to decrease. Their content is preferably 10 to 60% by weight, particularly preferably 20 to 50% by weight.

As fillers, there may be used, for example, tabular fillers such as mica, sericite and glass flake, silicates such as talc, kaolin, clay, wollastonite, bentonite, asbestos and aluminum silicate, metal oxides such as alumina, silicon oxide, magnesium oxide, zirconium oxide and titanium oxide, carbonates such as calcium carbonate, magnesium carbonate and dolomite, sulfates such as calcium sulfate and barium sulfate, and particulate fillers such as glass beads, ceramic beads, boron nitride and silicon carbide. The amount of filler added is preferably in the range from 5 to 50% by weight per 100% by weight of thermoplastic resin. These fibrous reinforcing materials and fillers may be used in combination of two kinds or more, respectively. Also, using these reinforcing fiber materials and fillers after being treated with a coupling agent (surface treatment agent) such as of the silane, epoxy or titanate is preferable in that better mechanical strength is obtained.

A laser ray transmitting member comprising the laser ray transmitting colored resin composition of the present invention can be used for a method of laser welding wherein laser is irradiated so that the laser penetrates the aforementioned laser ray transmitting member and is absorbed in a laser ray absorbing material with the aforementioned laser ray transmitting member and the aforementioned laser absorbing member in contact with each other, to weld the contact portion of the aforementioned laser ray transmitting member and laser ray absorbing member, whereby the laser-welded product of the present invention is obtained.

Generally, advantages of laser welding include increased degrees of freedom for the shapes of molds for the molded products of laser ray transmitting material and laser ray absorbing material to be welded because of the capability of 3-dimensional welding, improved appearance because of freedom from burrs on the welded surface unlike in vibration welding, and applicability to electronic components because of freedom from vibration and abrasion powder. Conversely, disadvantages of laser welding include the necessity of prior investment in equipment known as laser welding machine, and possible gap formation between the laser ray transmitting material and laser ray absorbing material to be welded, both of which are made of resin, due to sink during their molding. The problem with this gap, in particular, is of greatest concern in performing laser welding; there are many cases where a fixture such as a clamp is made on a case-by-case basis to adapt it to the shapes of the members to be welded. It is known that if a gap of 0.02 mm occurs, welding strength halves compared to the gap-free state, and that welding fails if the gap is 0.05 mm or more.

Available laser welding machines include the scanning type, in which laser moves, the masking type, in which the members to be welded move, and the type in which laser is irradiated to the members to be welded from multiple directions simultaneously. It is the scanning type which is drawing attention from the automobile industry, with a scanning speed of 5 m/min serving as the criterion for production tact time.

To increase production efficiency, the scanning speed must be increased; to achieve this, a laser welding machine of the high output type is necessary.

Additionally, to increase welding strength, some heat on the surface of the laser ray absorbing member is necessary. This heat must be determined by combining various conditions such as increased output setting, decreased scanning speed, and decreased spot diameter. Since too great surface heat provided by laser affects the appearance of the welded portion and, in the extreme case, causes the laser ray absorbing member to smoke, laser welding condition settings are important and the laser transmittance of the laser ray transmitting resin material to be welded is of paramount importance.

A laser ray absorbing member is a laser ray absorbing material with a laser ray absorbing layer having a laser absorbent, and the laser ray absorbing layer may be formed as a portion or all of the laser ray absorbing member at a position in contact with the laser ray transmitting member. Hence, the laser absorbent is present in the contact surface where laser welding is performed.

As substances that can be used as laser absorbents (also functioning as black colorants in some cases), there may be mentioned carbon black, nigrosine, aniline black and the like, or a combination of two kinds or more thereof (for example, a combination of carbon black and nigrosine). Other examples of laser absorbents include phthalocyanine, naphthalocyanine, perylene, quaterylene, metal complexes, squaric acid derivatives, immonium dyes, polymethine, and the like; two or more thereof may be blended to obtain a laser absorbent. Furthermore, it is also possible to use the aforementioned laser ray transmitting colorant and laser absorbent in combination as a colorant.

As carbon black with good laser absorbability, there may be mentioned those 15 to 100 nm (preferably 15 to 50 nm) in primary particle diameter, and those 30 to 500 $m^2/g$ (preferably 100 to 300 $m^2/g$) in BET specific surface area.

The amount of colorant used in such a laser ray absorbing colored resin composition (including laser ray absorbing colored thermoplastic elastomers) may be, for example, 0.01 to 10% by weight relative to thermoplastic resin or thermoplastic elastomer, and is preferably 0.05 to 5% by weight. The laser ray absorbing material can be produced in the same manner as the laser ray transmitting material except for the containment of a laser absorbent.

As major applications of the laser ray transmitting thermoplastic resin composition and laser-welded product of the present invention, there may be mentioned, for example, automobile parts. More specifically, there may be mentioned, for example, instrument panels in interiors and resonators (mufflers) in engine rooms. Conventionally, use of adhesives has been difficult in joining thermoplastic resin parts; to achieve their joining, special procedures such as surface treatment have been necessary. When laser welding is used, there is no need for pretreatment, resin alloying and the like; laser welding can be said to surpass adhesives also in terms of strength and recyclability.

EXAMPLES

The present invention is hereinafter described in more detail by means of, but is not limited to, the following examples. In the description below, "part(s) by weight" is referred to as "part(s)."

Production Example 1

10 parts of 8-hydroxyquinaldine and 13 parts of trimellitic anhydride were added to 50 parts of nitrobenzene, and the reaction was carried out with heating at 175 to 180° C. for 3 hours. Subsequently, 50 parts of methyl alcohol was added, and the precipitate separated out was collected by filtration and washed with water to yield 20 parts of Example Compound 1-1 (yield 97%).

Elemental Analysis Data
Measured: C, 68.12%, H, 3.38%, N, 4.17%.
Calculated: C, 68.47%, H, 3.33%, N, 4.20%.

Production Example 2

The reaction was carried out with heating at 175 to 180° C. in the same manner as Production Example 1 except that pyromellitic anhydride was used in place of trimellitic anhydride, and the temperature was kept at 175 to 180° C. until the reaction no longer proceeded. Subsequently, 20 parts of 3-methoxy-propylamine was added, and heating was continued at 175 to 180° C. for 3 hours. After completion of the reaction, 50 parts of methyl alcohol was added, and the precipitate separated out was collected by filtration and washed with water to yield 25 parts of Example Compound 1-2 (yield 89%).

Production Example 3

10 parts of 8-hydroxyquinaldine and 18 parts of trimellitic anhydride were added to 60 parts of nitrobenzene, and the reaction was carried out with heating at 175 to 180° C. for 3 hours. Subsequently, 60 parts of methyl alcohol was added, and the precipitate separated out was collected by filtration and washed with water to yield 25 parts of Example Compound 2-1 (yield 90%).

Physical Property Assessment Tests

Example Compounds 1-1 and 1-2 obtained in Production Examples 1 and 2 and the following Comparative Example Compounds 1 to 3 (colorants) were subjected to the following tests to assess their physical properties.

Comparative Example Compound 1

C.I. Acid Yellow 3

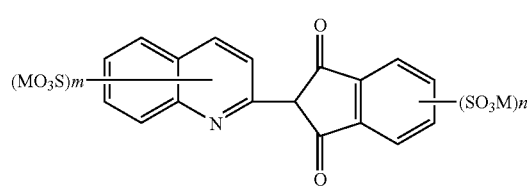

m+n=2 or 3 (putative structure)

Comparative Example Compound 2

C.I. Solvent Yellow 114

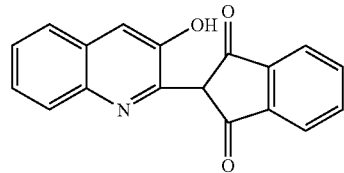

Comparative Example Compound 3

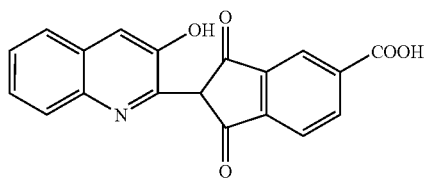

(1) Thermal Analysis (TG/DTA) Test

Each sample (colorant) was analyzed using a TG/DTA analyzer (manufactured by Seiko Instruments Inc., product name: SII EXSTAR6000) in an atmosphere of air at 200 ml/minute, at a heating rate of 10° C./minute from 30 to 550° C., and at a constant temperature of 550° C. for 28 minutes after reaching 550° C., to assess its applicability to high-melting resins, i.e., aromatic nylon and PPS (molding temperature 320° C.). In the TG/DTA chart, the presence of an endothermic peak between 200° C. and 350° C., which are close to the resin molding temperature, suggests that the bond in the compound as colorant is broken in the molding machine, resulting in test piece discoloration after the heat resistance test. Using a large molding machine, it is more likely that the test piece is exposed to high temperature for a longer time. The results are shown in Table 3.

Heat Resistance Criteria

○: No endothermic peak exists or an endothermic peak exists at a temperature of not lower than 380° C.

Δ: An endothermic peak exists at a temperature of not lower than 320° C. and lower than 380° C.

x: An endothermic peak exists at a temperature of lower than 320° C.

(2) Purity Determination (HPLC Analysis)

The purity of each sample (colorant) was determined at a flow rate of 0.5 ml/min and 45° C. using an HPLC system (manufactured by Shimadzu Corporation, product name LC-VP; SCL-10A, RID-10A, LC-10AT, CTO-10A, L-Column) with a 50% aqueous solution of acetonitrile as the carrier. The results are shown in Table 3.

TABLE 3

| Example Compound | (1) Thermal analysis | (2) Purity determination |
| --- | --- | --- |
| Example Compound 1-1 | ○ | 95.30% |
| Example Compound 1-2 | ○ | 98.80% |
| Comparative Example Compound 1 | Δ 343° C. | 96.10% |
| Comparative Example Compound 2 | X 268° C. | 95.70% |
| Comparative Example Compound 3 | Δ 364° C. | 95.30% |

In Examples 1 to 3, resin compositions obtained using polyamide 66 resin, aromatic nylon resin, and polyphenylene sulfide resin, respectively, and Example Compounds 1-1 and 1-2 and Comparative Example Compounds 1 to 3, were used to prepare molded resin test pieces. The physical property assessments of the individual molded test pieces are shown in Tables 4 to 6.

Example 1

Test Piece A 1000 g of polyamide 66 resin (manufactured by DuPont, product number: ZYTEL [Registered Trademark (the same applies below)] 70G33L) and 2 g of each colorant were placed in a stainless steel tumbler and mixed with stirring for 1 hour. The blend obtained was injection-molded by an ordinary method at a cylinder temperature of 290° C. and a mold temperature of 80° C. using an injection molding machine (manufactured by Toyo Machinery & Metal Co., Ltd., product name: Si-50); a uniformly colored yellow test piece having good appearance and surface gloss was obtained.

Example 2

Test Piece B 1000 g of aromatic nylon resin (manufactured by DuPont, product number: ZYTEL HTN51G35HSL) and 2 g of each colorant were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored yellow test piece having good appearance and surface gloss was obtained.

Example 3

Test Piece C 1000 g of polyphenylene sulfide resin (manufactured by Polyplastics Co., Ltd., product number: 0220A9) and 2 g of each colorant were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored yellow test piece having good appearance and surface gloss was obtained.

Physical Property Assessment Tests (3-1) Color

The colors of the test pieces obtained in the above-described injection molding were assessed by appearance. The results are shown in Tables 4 to 6.

Figure 2:
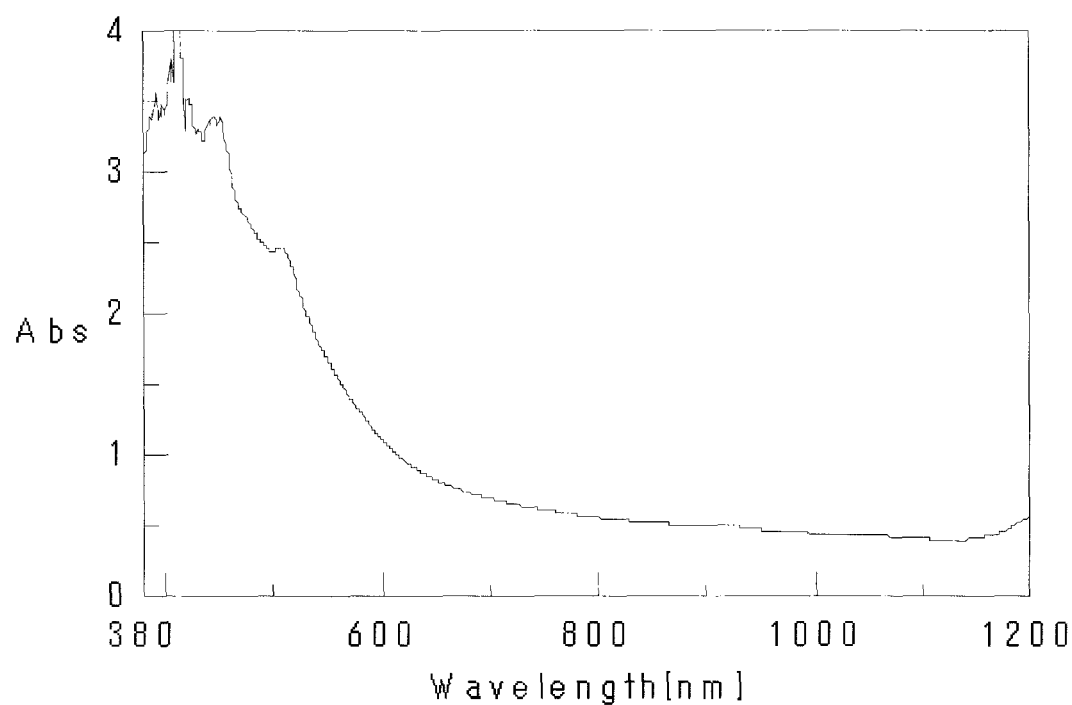
FIG. 2: The absorbance of test piece A-2.

Test piece A-1 and test piece A-2, which contained Example Compound 1-1 and Example Compound 1-2, respectively, were subjected to absorptiometry using a spectrophotometer (manufactured by JASCO Corporation, product name: V-570). With the abscissa indicating wavelength and the ordinate indicating absorbance, the measurement results are shown in FIGS. 1 and 2, respectively.

(3-2) Dispersibility and Assessment

If each piece obtained in the above-described injection molding was uniformly colored, the dispersibility was judged to be good (○), and if the test piece was ununiformly colored, the dispersibility was judged to be poor (x). The results are shown in Tables 4 to 6.

(3-3) Heat Resistance Test (Thermal Retention Test in Molding Machine) and Assessment In the injection molding above, a blend of ingredients was subjected to an ordinary shot, and thereafter the remaining portion of the blend was retained in the cylinder at the cylinder temperature for 15 minutes; injection molding was then conducted to yield test pieces.

The color difference ΔE between the test piece obtained by retention in the cylinder for 15 minutes and the test piece obtained by the ordinary shot was determined using a color difference meter (manufactured by JUKI Corporation, product name: JP7000). The results are shown in Tables 4 to 6. If ΔE is not more than 1.0, the resin composition was judged to be resistant to heat.

(3-4) Moisture Resistance Test and Assessment

Each test piece was placed in a constant-temperature chamber and allowed to stand at 80° C. and a humidity of 95% for 1 week, after which the surface of the test piece was wiped with a white cloth. If the colorant adhered to the white cloth, it was judged that the colorant had migrated from inside the test piece. The results are shown in Tables 4 to 6.

Moisture Resistance Ratings

○: No color is observed in the white cloth.

Δ: Although little color is observed in the white cloth, the cloth is lightly colored and is distinguishable from the original white cloth.

x: A distinct color is observed in the white cloth.

(3-5) Solvent Resistance Test and Assessment

Each test piece was completely immersed in ethyleneglycol and the container was sealed and allowed to stand at 80° C. in a constant-temperature chamber for 100 hours. Subsequently, the color of the ethyleneglycol solution was visually examined. If the ethyleneglycol solution gets colored, it is postulated that a portion of the colorant in the test piece has eluted and diffused in the ethyleneglycol. In such cases, the resin composition was judged to have no solvent resistance. The results are shown in Tables 4 to 6.

Solvent Resistance Ratings

○: No elution of colorant is observed.

x: Elution of colorant is observed.

(3-6) Anti-Sublimation Test and Assessment

Each test piece with a white PET (polyethylene terephthalate resin) film applied thereto was placed in an oven and allowed to stand at 160° C. for 3 hours. Subsequently, the PET film was removed from the test piece and applied to a colorless transparent OHP (overhead projector) sheet to facilitate observation. If the colorant had not migrated to the PET film, the resin composition was judged to have anti-sublimation quality. The results are shown in Tables 4 to 6.

Anti-Sublimation Quality Ratings

○: No color is observed in the PET film.

Δ: Although little color is observed in the PET film, the film is lightly colored and is distinguishable from the original PET film.

x: A distinct color is observed in the PET film.

TABLE 4

Assessment Results for Test Piece A

| Test A | Colorant | (3-1) Color | (3-2) Dispersibility | (3-3) Heat resistance test | (3-4) Moisture resistance test | (3-5) Solvent resistance test | (3-6) Anti-sublimation quality test |
|---|---|---|---|---|---|---|---|
| A-1 | Example Compound 1-1 | Yellow | ○ | 0.91 | ○ | ○ | ○ |
| A-2 | Example Compound 1-2 | Yellow | ○ | 0.78 | ○ | ○ | ○ |
| A-3 | Comparative Example Compound 1 | Yellow | X | 1.56 | Δ | X | Δ |
| A-4 | Comparative Example Compound 2 | Yellow | ○ | 2.34 | X | X | X |
| A-5 | Comparative Example Compound 3 | Brown | ○ | 1.11 | Δ | X | Δ |

TABLE 5

Assessment Results for Test Piece B

| Test B | Colorant | (3-1) Color | (3-2) Dispersibility | (3-3) Heat resistance test | (3-4) Moisture resistance test | (3-5) Solvent resistance test | (3-6) Anti-sublimation quality test |
|---|---|---|---|---|---|---|---|
| B-1 | Example Compound 1-1 | Yellow | ○ | 0.88 | ○ | ○ | ○ |
| B-2 | Example Compound 1-2 | Yellow | ○ | 0.61 | ○ | ○ | ○ |
| B-3 | Comparative Example Compound 2 | Yellow | ○ | 3.01 | X | X | X |
| B-4 | Comparative Example Compound 3 | Brown | ○ | 3.01 | Δ | X | Δ |

TABLE 6

Assessment Results for Test Piece C

| Test C | Colorant | (3-1) Color | (3-2) Dispersibility | (3-3) Heat resistance test | (3-4) Moisture resistance test | (3-5) Solvent resistance test | (3-6) Anti-sublimation quality test |
|---|---|---|---|---|---|---|---|
| C-1 | Example Compound 1-1 | Yellow | ○ | 0.83 | ○ | ○ | ○ |
| C-2 | Example Compound 1-2 | Yellow | ○ | 0.75 | ○ | ○ | ○ |
| C-3 | Comparative Example Compound 1 | Yellow | ○ | 0.9 | ○ | ○ | ○ |
| C-4 | Comparative Example Compound 2 | Yellow | ○ | 2.11 | ○ | ○ | X |

TABLE 6-continued

Assessment Results for Test Piece C

| Test C | | (3-1) Color | (3-2) Dispersibility | (3-3) Heat resistance test | (3-4) Moisture resistance test | (3-5) Solvent resistance test | (3-6) Anti-sublimation quality test |
|---|---|---|---|---|---|---|---|
| C-4 | Comparative Example Compound 3 | Brown | ○ | 2.11 | ○ | ○ | Δ |

In Examples 4 to 6, a resin composition was obtained using a mixed colorant comprising the quinophthalone compound of the present invention (yellow colorant) and another colorant, and this was injection-molded to yield molded resin test pieces. The test pieces obtained were assessed in the same manner as Examples 1 to 3, and the results are shown in Table 7.

Example 4

Hexamethylenediamine salt of C.I. Acid Blue 80 (anthraquinone acid dye) . . . 40 g Hexamethylenediamine salt of C.I. Acid Red 80 (anthrapyridone acid dye) . . . 30 g Example Compound 1-1 (colorant) . . . 30 g The above ingredients were placed in a stainless steel tumbler and mixed with stirring for 1 hour to yield 95 g of a black mixed colorant.

400 g of aromatic nylon resin (manufactured by DuPont, product number: ZYTEL HTN51G35HSL) and 1.6 g of the above-described mixed colorant were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored black test piece having good appearance and surface gloss was obtained.

Example 5

Hexamethylenediamine salt of C.I. Acid Blue 80 (anthraquinone acid dye) . . . 40 g Hexamethylenediamine salt of C.I. Acid Red 143 (anthrapyridone acid dye) . . . 20 g Example Compound 1-2 (colorant) . . . 30 g The above ingredients were placed in a stainless steel tumbler and mixed with stirring for 1 hour to yield 86 g of a black mixed colorant.

400 g of polyamide 66 resin (manufactured by DuPont, product number: ZYTEL 70G33L) and 1.6 g of the above-described mixed colorant were placed in a stainless steel tumbler and mixed with stirring for 1 hour. The blend obtained was injection-molded by an ordinary method at a cylinder temperature of 290° C. and a mold temperature of 80° C. using an injection molding machine (manufactured by Toyo Machinery & Metal Co., Ltd., product name: Si-50); a uniformly colored black test piece having good appearance and surface gloss was obtained.

Example 6

Hexamethylenediamine salt of C.I. Acid Blue 127 (anthraquinone acid dye) . . . 40 g Colorant of Example Compound 1-2 . . . 40 g The above ingredients were placed in a stainless steel tumbler and mixed with stirring for 1 hour to yield 75 g of a green mixed colorant.

400 g of polyamide 66 resin (manufactured by DuPont, product number: ZYTEL 70G33L) and 1.6 g of the above-described mixed colorant were placed in a stainless steel tumbler and mixed with stirring for 1 hour. The blend obtained was injection-molded by an ordinary method at a cylinder temperature of 290° C. and a mold temperature of 80° C. using an injection molding machine (manufactured by Toyo Machinery & Metal Co., Ltd., product name: Si-50); a uniformly colored green test piece having good appearance and surface gloss was obtained.

In Examples 7 to 9, a high-concentration resin composition (master batch) was obtained using a mixed colorant comprising the quinophthalone compound of the present invention (yellow colorant) and another colorant, and diluted with a non-colored resin to yield a resin composition, which was injection-molded to yield laser ray transmitting resin test pieces. The test pieces obtained were assessed in the same manner as Examples 1 to 3, and the results are shown in Table 7.

Example 7

Polyamide 66 resin (manufactured by DuPont, product number: ZYTEL 101NC010L) . . . 900 g Hexamethylenediamine salt of C.I. Acid Red 143 (anthrapyridone acid dye) . . . 50 g Example Compound 1-1 (colorant) . . . 50 g The above ingredients were placed in a stainless steel tumbler and mixed with stirring for 1 hour. The blend obtained was kneaded in a molten state at a cylinder temperature of 290° C. using a single-axis extruding machine (manufactured by Enpura Sangyo, product number: E30SV). The kneaded blend was cut into colored pellets using a pelletizer with cooling in a water chamber. Subsequently, a drying process was followed to yield an orange master batch having a colorant concentration of 10% by weight.

Polyamide 66 resin (manufactured by DuPont, product number: ZYTEL 70G33L) . . . 490 g The aforementioned orange master batch . . . 10 g Subsequently, the above ingredients were placed in a stainless steel tumbler and mixed with stirring for 1 hour. The blend obtained was injection-molded by an ordinary method at a cylinder temperature of 290° C. and a mold temperature of 80° C. using an injection molding machine (manufactured by Toyo Machinery & Metal Co., Ltd., product name: Si-50); a uniformly colored orange test piece having good appearance and surface gloss was obtained.

Example 8

Aromatic nylon (manufactured by DuPont, product number: ZYTEL HTN501NC010) . . . 900 g Hexamethylenediamine salt of C.I. Acid Blue 80 . . . 40 g Hexamethylenediamine salt of C.I. Acid Red 80 . . . 30 g Example Compound 1-1 (colorant) . . . 30 g The above ingredients were placed in a stainless steel tumbler and mixed with stirring for 1 hour. The blend obtained was kneaded in a molten state at a cylinder temperature of 320° C. using a single-axis extruding machine (manufactured by Enpura Sangyo, product number: E30SV). The kneaded blend was cut into colored pellets using a pelletizer with cooling in a water chamber. Subsequently, a drying process was followed to yield a black master batch having a colorant concentration of 10% by weight.

Aromatic nylon (manufactured by DuPont, product number: ZYTEL HTN51G35HSL) . . . 475 g The aforementioned black master batch . . . 25 g Subsequently, the above ingredients were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored black test piece having good appearance and surface gloss was obtained.

Example 9

Polyphenylene sulfide (manufactured by Polyplastics Co., Ltd., product number: 0220A9) . . . 900 g Example Compound 1-2 (colorant) . . . 100 g The above ingredients were placed in a stainless steel tumbler and mixed with stirring for 1 hour. The blend obtained was kneaded in a molten state at a cylinder temperature of 310° C. using a single-axis extruding machine (manufactured by Enpura Sangyo, product number: E30SV). The kneaded blend was cut into colored pellets using a pelletizer with cooling in a water chamber. Subsequently, a drying process was followed to yield a yellow master batch having a colorant concentration of 10% by weight.

Polyphenylene sulfide (manufactured by Polyplastics Co., Ltd., product number: 0220A9) . . . 490 g The aforementioned yellow master batch . . . 10 g Subsequently, the above ingredients were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored yellow test piece having good appearance and surface gloss was obtained.

Test pieces incorporating the mixed colorants and high-concentration colored resin compositions of Examples 4 to 9 were subjected to the tests (3-1) to (3-6) above. The results are shown in Table 7.

TABLE 7

Assessment Result Obtained Using mixed colorants and High-Concentration Resin Compositions

| | (3-1) Color | (3-2) Dispersibility | (3-3) Heat resistance test | (3-4) Moisture resistance test | (3-5) Solvent resistance test | (3-6) Anti-sublimation quality test |
|---|---|---|---|---|---|---|
| Example 1 | Black | ○ | 0.55 | ○ | ○ | ○ |
| Example 2 | Black | ○ | 0.58 | ○ | ○ | ○ |
| Example 3 | Green | ○ | 0.49 | ○ | ○ | ○ |
| Example 4 | Orange | ○ | 0.82 | ○ | ○ | ○ |
| Example 5 | Black | ○ | 0.63 | ○ | ○ | ○ |
| Example 6 | Yellow | ○ | 0.85 | ○ | ○ | ○ |

Example 10

Preparation of Laser Ray Absorbing Test Pieces

Carbon black, both as a laser absorbent and as a black colorant, was blended with each of polyamide 66 resin, aromatic nylon resin, and polyphenylene sulfide resin, to yield respective resin compositions. These resin compositions were injection-molded to yield black laser ray absorbing test pieces D, E, and F.

(1) Test Piece D 1000 g of polyamide 66 resin (manufactured by DuPont, product number: ZYTEL 70G33L) and 0.2 g of carbon black were placed in a stainless steel tumbler and mixed with stirring for 1 hour. The blend obtained was injection-molded by an ordinary method at a cylinder temperature of 290° C. and a mold temperature of 80° C. using an injection molding machine (manufactured by Toyo Machinery & Metal Co., Ltd., product name: Si-50); a uniformly colored black test piece having good appearance and surface gloss was obtained.

(2) Test Piece E 1000 g of aromatic nylon resin (manufactured by DuPont, product number: ZYTEL HTN51G35HSL) and 0.2 g of carbon black were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery &

Metal Co., Ltd., product name: Si-50); a uniformly colored black test piece having good appearance and surface gloss was obtained.

(3) Test Piece F 1000 g of polyphenylene sulfide resin (manufactured by Polyplastics Co., Ltd., product number: 0220A9) and 0.5 g of carbon black were placed in a stainless steel tumbler and mixed with stirring for 1 hour. The blend obtained was injection-molded by an ordinary method at a cylinder temperature of 320° C. and a mold temperature of 140° C. using an injection molding machine (manufactured by Toyo Machinery & Metal Co., Ltd., product name: Si-50); a uniformly colored black test piece having good appearance and surface gloss was obtained.

Examples 11 to 13

Laser Welding Test and Laser-Welded Product

In Examples 11 to 13, a laser welding test was performed using the laser ray transmitting test pieces obtained in Examples 7 to 9 and the laser ray absorbing test pieces obtained in Example 10 to yield laser-welded products.

(4) Laser Welding Test

Combinations of the laser ray transmitting test pieces and laser ray absorbing test pieces shown in Table 8 were subjected to a laser welding test as described below.

Figure 3:
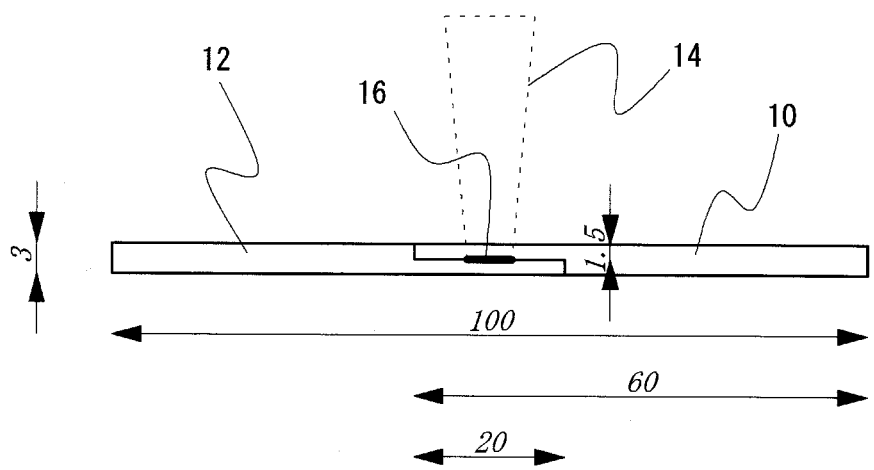
FIG. 3: A lateral view of the laser welding test.
Figure 4:
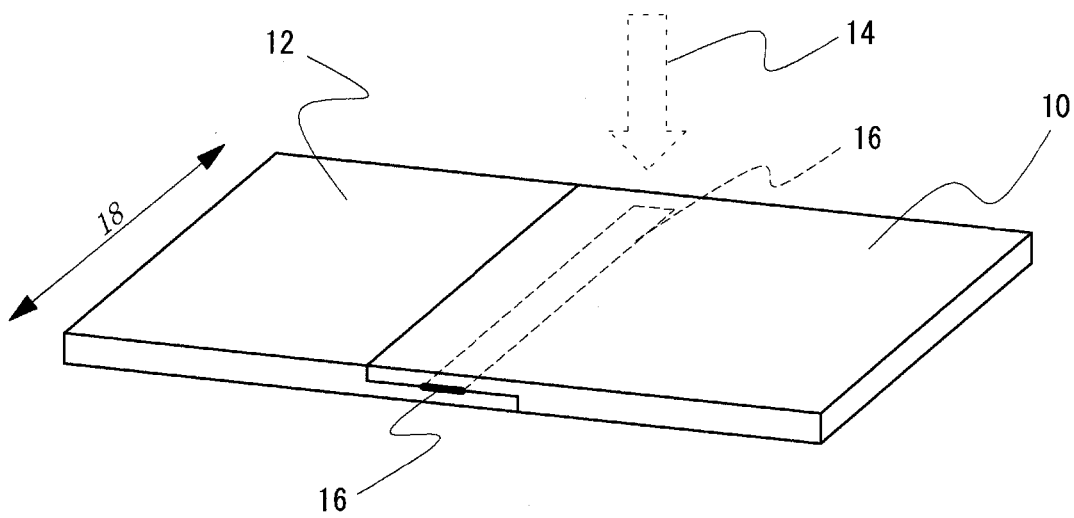
FIG. 4: An oblique view of the laser welding test.

As shown in FIG. 3 (lateral view) and FIG. 4 (oblique view), each of the laser ray transmitting test pieces obtained in Examples 7 to 9 (test piece 10) and each of laser ray absorbing test pieces D, E, and F (test piece 12) [all 60 mm length×18 mm width×3 mm thickness (1.5 mm thickness for 20 mm of the length)] were superposed with respective portions 20 mm length×18 mm width×1.5 mm thickness in contact with each other.

The superposed portions were irradiated with a laser beam 14 from above the test piece 10 (in the Figure) using a diode laser of 60 W output [wavelength: 940 nm, continuous] (manufactured by Fine Devices Company), while scanning at a variable scanning speed in the lateral direction (direction perpendicular to the plane of FIG. 3).

If the laser penetrates the test piece 10 and is absorbed in the laser ray absorbing test piece 12, the laser ray absorbing test piece 12 would generate heat, by which heat the laser ray absorbing test piece 12 is molten around the portion that has absorbed the laser ray, and the test piece 10 is also molten, the resins of the two test pieces fuse together, and upon cooling the two pieces are joined together to yield a laser-welded product. In FIG. 4, 16 indicates the welded portion.

(5) Determination of Transmittance

Each of the test pieces of Examples 7 to 9 was set to a spectrophotometer (manufactured by JASCO Corporation, product number: V-570 model), and its transmittance was determined. Table 8 shows the transmittances of the test pieces for semiconductor laser at a wavelength of 940 nm.

(6) Tensile Strength Test

The welded-product obtained in (4) above was subjected to a tensile strength test on both the laser ray transmitting test piece 10 side and the laser ray absorbing test piece 12 side in the longitudinal direction (left-right direction in FIG. 3) at a pulling speed of 10 mm/min in accordance with JIS-K7113-1995 using a tensile strength tester (AG-50kNE, manufactured by Shimadzu Corporation), in order to determine its tensile welding strength. In the welding performance field, ○ indicates good performance, and x indicates poor performance.

TABLE 8

| Example | Laser ray transmitting test piece | Laser ray absorbing test piece | Transmittance test (%) | (4) Laser welding test | | | (6) Tensile strength test |
| | | | | Scanning speed (mm/sec) | Output (W) | Welding performance | Tensile strength (MPa) |
| --- | --- | --- | --- | --- | --- | --- | --- |
| Example 11 | Test piece obtained in Example 7 | Test piece D | 67 | 100 | 60 | X | — |
| | | | | 75 | 60 | ○ | 24.6 |
| | | | | 60 | 60 | ○ | 28.1 |
| | | | | 50 | 60 | ○ | 33.0 |
| Example 12 | Test piece obtained in Example 8 | Test piece E | 40 | 50 | 60 | X | 4.7 |
| | | | | 30 | 60 | ○ | 27.5 |
| | | | | 25 | 60 | ○ | 30.3 |
| | | | | 20 | 60 | ○ | 33.3 |
| Example 13 | Test piece obtained in Example 9 | Test Piece F | 41 | 30 | 60 | X | — |
| | | | | 20 | 60 | ○ | 25.8 |
| | | | | 15 | 60 | ○ | 28.7 |
| | | | | 10 | 60 | ○ | 32.5 |

The invention claimed is:

1. Laser-welded product wherein a laser ray transmitting member made of a laser ray transmitting colored resin composition which contains a thermoplastic resin or a thermoplastic elastomer and a quinophthalone compound represented by Formula (1) or (2) below and a laser ray absorbing member made of a resin composition having a thermoplastic resin or a thermoplastic elastomer, and having a laser ray absorbing layer, have been welded by laser welding with laser ray that has penetrated said laser ray transmitting member:

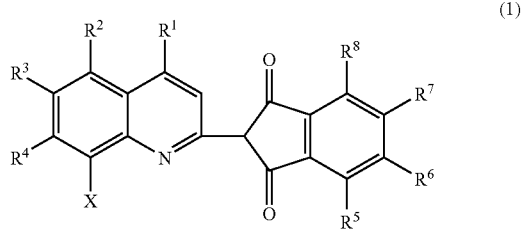

(1)

-continued

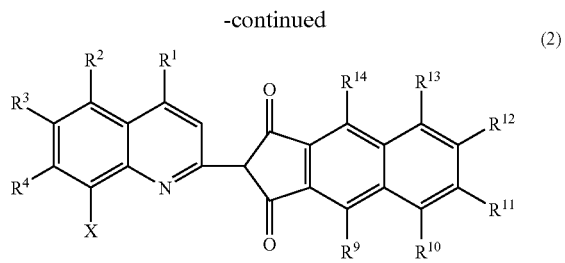
(2)

in each of Formulas (1) and (2),
each of $R^1$ to $R^8$ in Formula (1) and $R^1$ to $R^4$ and $R^9$ to $R^{14}$ in Formula (2) independently represents a hydrogen atom, a nitro group, a mercapto group, a carboxyl group, a cyano group, a thiocyano group, a halogen atom, an alkyl group, a cycloalkyl group, an aryl group, an amino group, an acyl group, an alkoxy group, an aryloxy group, a heterocyclic oxy group, an acyloxy group, an alkylsulfonyloxy group, an arylsulfonyloxy group, an alkoxycarbonyloxy group, an aryloxycarbonyloxy group, an alkoxycarbonyl group, a cycloalkyloxycarbonyl group, an aryloxycarbonyl group, a heterocyclic oxycarbonyl group, a carbamoyl group, a sulfamoyl group, an alkylsulfonyl group, an arylsulfonyl group, an alkylthio group, an arylthio group, a heterocyclic thio group, an alkoxysulfonyl group, a cycloalkyloxysulfonyl group, an aryloxysulfonyl group, or a heterocyclic oxysulfonyl group;
at least one of $R^5$ to $R^8$ in Formula (1) is a carboxyl group, and at least one of $R^9$ to $R^{14}$ in Formula (2) is a carboxyl group.

2. Laser-welded product of claim 1, wherein said quinophthalone compound has an endothermic peak at a temperature of not lower than 380° C.

3. Laser-welded product of claim 1, wherein said laser ray transmitting colored resin composition contains said quinophthalone compound as a coloring ingredient, and another coloring ingredient.

4. Laser-welded product of claim 3, wherein said laser ray transmitting colored resin composition has a black color.

5. Laser-welded product of claim 3, wherein said other coloring ingredient is one or two or more selected from the group consisting of azo dyes/pigments, azo metal complex dyes/pigments, naphtholazo dyes/pigments, azo lake dyes/pigments, azomethine dyes/pigments, anthraquinone dyes/pigments, quinacridone dyes/pigments, dioxazine dyes/pigments, diketopyrrolopyrrole dyes/pigments, anthrapyridone dyes/pigments, isoindolinone dyes/pigments, indanthrone dyes/pigments, perinone dyes/pigments, perylene dyes/pigments, indigo dyes/pigments, thioindigo dyes/pigments, quinoline dyes/pigments, benzimidazolone dyes/pigments, and triphenylmethane dyes/pigments.

6. Laser-welded product of claim 3, wherein said other coloring ingredient is one or two or more selected from the group consisting of, near-infrared ray transmitting, azo dyes, triphenylmethane dyes, anthraquinone dyes, perinone dyes, and anthrapyridone dyes.

7. Laser-welded product of claim 6, wherein said other coloring ingredient is a salt forming dye prepared by allowing an acid dye to form a salt with an organic amine.

8. Laser-welded product of claim 1, wherein the thermoplastic resin in said laser ray transmitting colored resin composition is a polyamide resin, a polyester resin, or a polyphenylene sulfide resin.

9. Laser-welded product of claim 1, wherein said laser ray transmitting colored resin composition is obtained by mixing a thermoplastic resin or a thermoplastic elastomer and a master batch containing said quinophthalone compound in a thermoplastic resin or a thermoplastic elastomer.

10. Laser-welded product of claim 3, wherein said laser ray transmitting colored resin composition is obtained by mixing a thermoplastic resin or a thermoplastic elastomer and a master batch containing said quinophthalone compound and said other coloring ingredient in a thermoplastic resin or a thermoplastic elastomer.

11. Laser-welded product of claim 9, wherein the thermoplastic resin in said laser ray transmitting colored resin composition and said master batch is a polyamide resin, a polyester resin, or a polyphenylene sulfide resin.

12. The laser-welded product of claim 1, wherein:
each of $R^1$ to $R^8$ in Formula (1) and $R^1$ to $R^4$ and $R^9$ to $R^{14}$ in Formula (2) independently represents a hydrogen atom, a carboxyl group, a chlorine atom, a fluorine atom, an iodine atom, carbamoyl group or sulfamoyl group;
at least one of $R^5$ to $R^8$ in Formula (1) is a carboxyl group, and at least one of $R^9$ to $R^{14}$ in Formula (2) is a carboxyl group.

13. The laser-welded product of claim 2, wherein:
each of $R^1$ to $R^8$ in Formula (1) and $R^1$ to $R^4$ and $R^9$ to $R^{14}$ in Formula (2) independently represents a hydrogen atom, a carboxyl group, a chlorine atom, a fluorine atom, an iodine atom, carbamoyl group or sulfamoyl group;
at least one of $R^5$ to $R^8$ in Formula (1) is a carboxyl group, and at least one of $R^9$ to $R^{14}$ in Formula (2) is a carboxyl group.

14. The laser-welded product of claim 7, wherein:
each of $R^1$ to $R^8$ in Formula (1) and $R^1$ to $R^4$ and $R^9$ to $R^{14}$ in Formula (2) independently represents a hydrogen atom, a carboxyl group, a chlorine atom, a fluorine atom, an iodine atom, carbamoyl group or sulfamoyl group;
at least one of $R^5$ to $R^8$ in Formula (1) is a carboxyl group, and at least one of $R^9$ to $R^{14}$ in Formula (2) is a carboxyl group.

15. The laser-welded product of claim 8, wherein each of $R^1$ to $R^8$ in Formula (1) and $R^1$ to $R^4$ and $R^9$ to $R^{14}$ in Formula (2) independently represents a hydrogen atom, a carboxyl group, a chlorine atom, a fluorine atom, an iodine atom, carbamoyl group or sulfamoyl group;
at least one of $R^5$ to $R^8$ in Formula (1) is a carboxyl group, and at least one of $R^9$ to $R^{14}$ in Formula (2) is a carboxyl group.

16. The laser-welded product of claim 1, wherein:
each of $R^1$ to $R^4$, $R^5$ and $R^8$ in Formula (1) and $R^1$ to $R^4$ and $R^9$, $R^{10}$, $R^{13}$ and $R^{14}$ in Formula (2) represents a hydrogen atom;
each of $R^6$ and $R^7$ in Formula (1) and $R^{11}$ and $R^{12}$ in Formula (2) independently represents a hydrogen atom or a carboxyl group;
at least one of $R^6$ and $R^7$ in Formula (1) is a carboxyl group, and at least one of $R^{11}$ and $R^{12}$ in Formula (2) is a carboxyl group.

17. The laser-welded product of claim 2, wherein:
each of $R^1$ to $R^4$, $R^5$ and $R^8$ in Formula (1) and $R^1$ to $R^4$ and $R^9$, $R^{10}$, $R^{13}$ and $R^{14}$ in Formula (2) represents a hydrogen atom;
each of $R^6$ and $R^7$ in Formula (1) and $R^{11}$ and $R^{12}$ in Formula (2) independently represents a hydrogen atom or a carboxyl group;
at least one of $R^6$ and $R^7$ in Formula (1) is a carboxyl group, and at least one of $R^{11}$ and $R^{12}$ in Formula (2) is a carboxyl group.

18. The laser-welded product of claim 7, wherein:

each of $R^1$ to $R^4$, $R^5$ and $R^8$ in Formula (1) and $R^1$ to $R^4$ and $R^9$, $R^{10}$, $R^{13}$ and $R^{14}$ in Formula (2) represents a hydrogen atom;

each of $R^6$ and $R^7$ in Formula (1) and $R^{11}$ and $R^{12}$ in Formula (2) independently represents a hydrogen atom or a carboxyl group;

at least one of $R^6$ and $R^7$ in Formula (1) is a carboxyl group, and at least one of $R^{11}$ and $R^{12}$ in Formula (2) is a carboxyl group.

19. The laser-welded product of claim 8, wherein:

each of $R^1$ to $R^4$, $R^5$ and $R^8$ in Formula (1) and $R^1$ to $R^4$ and $R^9$, $R^{10}$, $R^{13}$ and $R^{14}$ in Formula (2) represents a hydrogen atom;

each of $R^6$ and $R^7$ in Formula (1) and $R^{11}$ and $R^{12}$ in Formula (2) independently represents a hydrogen atom or a carboxyl group;

at least one of $R^6$ and $R^7$ in Formula (1) is a carboxyl group, and at least one of $R^{11}$ and $R^{12}$ in Formula (2) is a carboxyl group.

20. The laser-welded product of claim 1, wherein:

said quinophthalone compound is the quinophthalone compound represented by Formula (1);

each of $R^1$ to $R^4$, $R^5$ and $R^8$ in Formula (1) represents a hydrogen atom;

each of $R^6$ and $R^7$ in Formula (1) independently represents a hydrogen atom or a carboxyl group;

at least one of $R^6$ and $R^7$ in Formula (1) is a carboxyl group.

21. The laser-welded product of claim 2, wherein:

said quinophthalone compound is the quinophthalone compound represented by Formula (1);

each of $R^1$ to $R^4$, $R^5$ and $R^8$ in Formula (1) represents a hydrogen atom;

each of $R^6$ and $R^7$ in Formula (1) independently represents a hydrogen atom or a carboxyl group;

at least one of $R^6$ and $R^7$ in Formula (1) is a carboxyl group.

22. The laser-welded product of claim 7, wherein:

said quinophthalone compound is the quinophthalone compound represented by Formula (1);

each of $R^1$ to $R^4$, $R^5$ and $R^8$ in Formula (1) represents a hydrogen atom;

each of $R^6$ and $R^7$ in Formula (1) independently represents a hydrogen atom or a carboxyl group;

at least one of $R^6$ and $R^7$ in Formula (1) is a carboxyl group.

23. The laser-welded product of claim 8, wherein:

said quinophthalone compound is the quinophthalone compound represented by Formula (1);

each of $R^1$ to $R^4$, $R^5$ and $R^8$ in Formula (1) represents a hydrogen atom;

each of $R^6$ and $R^7$ in Formula (1) independently represents a hydrogen atom or a carboxyl group;

at least one of $R^6$ and $R^7$ in Formula (1) is a carboxyl group.

24. The laser-welded product of claim 1, wherein:

said quinophthalone compound is the quinophthalone compound represented by Formula (1);

each of $R^1$ to $R^6$ and $R^8$ in Formula (1) represents a hydrogen atom;

$R^7$ in Formula (1) represents a carboxyl group.

25. The laser-welded product of claim 2, wherein:

said quinophthalone compound is the quinophthalone compound represented by Formula (1);

each of $R^1$ to $R^6$ and $R^8$ in Formula (1) represents a hydrogen atom;

$R^7$ in Formula (1) represents a carboxyl group.

26. The laser-welded product of claim 7, wherein:

said quinophthalone compound is the quinophthalone compound represented by Formula (1);

each of $R^1$ to $R^6$ and $R^8$ in Formula (1) represents a hydrogen atom;

$R^7$ in Formula (1) represents a carboxyl group.

27. The laser-welded product of claim 8, wherein:

said quinophthalone compound is the quinophthalone compound represented by Formula (1);

each of $R^1$ to $R^6$ and $R^8$ in Formula (1) represents a hydrogen atom;

$R^7$ in Formula (1) represents a carboxyl group.

* * * * *

UNITED STATES PATENT AND TRADEMARK OFFICE
CERTIFICATE OF CORRECTION

| | | |
|---|---|---|
| PATENT NO. | : 7,879,929 B2 | |
| APPLICATION NO. | : 11/571916 | |
| DATED | : February 1, 2011 | |
| INVENTOR(S) | : Shuji Sugawara and Yoshiteru Hatase | |

It is certified that error appears in the above-identified patent and that said Letters Patent is hereby corrected as shown below:

Column 34, line 46 thru Column 35, line 33, claim 1 should read:

1. Laser-welded product wherein a laser ray transmitting member made of a laser ray transmitting colored resin composition which contains a thermoplastic resin or a thermoplastic elastomer and a quinophthalone compound represented by Formula (1) or (2) below and a laser ray absorbing member made of a resin composition having a thermoplastic resin or a thermoplastic elastomer, and having a laser ray absorbing layer, have been welded by laser welding with laser ray that has penetrated said laser ray transmitting member:

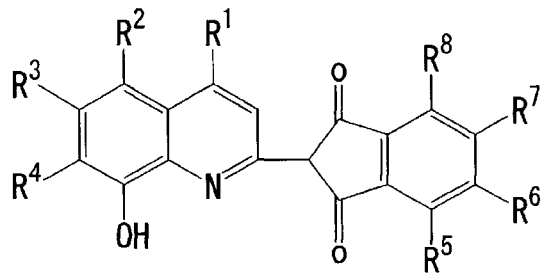

.... (1)

Signed and Sealed this
Seventeenth Day of May, 2011

David J. Kappos
*Director of the United States Patent and Trademark Office*

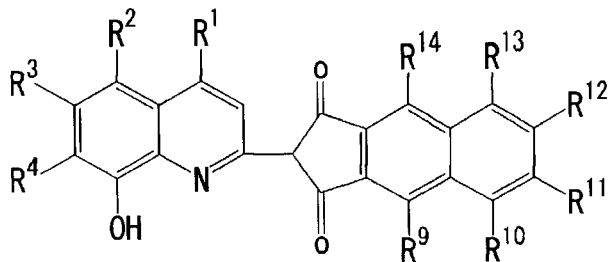

.... (2)

in each of Formulas (1) and (2), each of $R^1$ to $R^8$ in Formula (1) and $R^1$ to $R^4$ and $R^9$ to $R^{14}$ in Formula (2) independently represents a hydrogen atom, a nitro group, a mercapto group, a carboxyl group, a cyano group, a thiocyano group, a halogen atom, an alkyl group, a cycloalkyl group, an aryl group, an amino group, an acyl group, an alkoxy group, an aryloxy group, a heterocyclic oxy group, an acyloxy group, an alkylsulfonyloxy group, an arylsulfonyloxy group, an alkoxycarbonyloxy group, an aryloxycarbonyloxy group, an alkoxycarbonyl group, a cycloalkyloxycarbonyl group, an aryloxycarbonyl group, a heterocyclic oxycarbonyl group, a carbamoyl group, a sulfamoyl group, an alkylsulfonyl group, an arylsulfonyl group, an alkylthio group, an arylthio group, a heterocyclic thio group, an alkoxysulfonyl group, a cycloalkyloxysulfonyl group, an aryloxysulfonyl group, or a heterocyclic oxysulfonyl group;

at least one of $R^5$ to $R^8$ in Formula (1) is a carboxyl group, and at least one of $R^9$ to $R^{14}$ in Formula (2) is a carboxyl group.